US011098794B2

(12) United States Patent
Yudell et al.

(10) Patent No.: US 11,098,794 B2
(45) Date of Patent: Aug. 24, 2021

(54) LOCKING ANGLE GEAR BOX

(71) Applicant: TEAM Industries, Inc., Bagley, MN (US)

(72) Inventors: Alexander C. Yudell, Bemidji, MN (US); Gregory Lee Maki, Solway, MN (US); Ronald Joseph Wendt, Bemidji, MN (US); Kody P. Kawlewski, Bemidji, MN (US); Roland R. Roth, Solway, MN (US); Brandon P. Lenk, Shevlin, MN (US)

(73) Assignee: TEAM Industries, Inc., Bagley, MN (US)

( * ) Notice: Subject to any disclaimer, the term of this patent is extended or adjusted under 35 U.S.C. 154(b) by 54 days.

(21) Appl. No.: 16/396,169

(22) Filed: Apr. 26, 2019

(65) Prior Publication Data

US 2019/0331206 A1 Oct. 31, 2019

Related U.S. Application Data

(60) Provisional application No. 62/663,221, filed on Apr. 26, 2018.

(51) Int. Cl.
*F16H 48/24* (2006.01)
*F16H 48/08* (2006.01)
(Continued)

(52) U.S. Cl.
CPC ............ *F16H 48/24* (2013.01); *F16H 48/08* (2013.01); *F16H 48/22* (2013.01); *F16H 48/32* (2013.01); *F16H 48/34* (2013.01)

(58) Field of Classification Search
CPC .......... F16H 48/24; F16H 48/08; F16H 48/22; F16H 48/32; F16H 48/34; F16H 2048/085
See application file for complete search history.

(56) References Cited

U.S. PATENT DOCUMENTS

| 1,427,612 A | 8/1922 | Marcy |
| 1,447,116 A | 2/1923 | Baird et al. |

(Continued)

FOREIGN PATENT DOCUMENTS

| DE | 102013109835 A1 | 3/2015 | |
| GB | 155139 A * | 12/1920 | ............ F16H 48/24 |

(Continued)

OTHER PUBLICATIONS

International Searching Authority, "International Search Report and Written Opinion from PCT Application No. PCT/US2019/029433 dated Jul. 25, 2019", from Foreign Counterpart to U.S. Appl. No. 16/396,169, pp. 1-18, Published: WO.

(Continued)

*Primary Examiner* — Justin Holmes
(74) *Attorney, Agent, or Firm* — Fogg & Powers LLC

(57) ABSTRACT

A locking angle gear box is provided. The locking angle gear box includes a torque transfer assembly, a ring gear, at least one connection drive assembly and an actuator. The torque transfer assembly is configured to communicate torque between the torque transfer assembly and a pair of outputs to halfshafts. The ring gear is rotationally supported on the torque transfer assembly. The ring gear is configured to transfer torque between at least a portion of a driveline and the torque transfer assembly. The at least one connection drive assembly is configured to selectively lock rotation of the torque transfer assembly with the rotation of the ring gear to selectively couple torque between the torque transfer assembly and the ring gear. The actuator is in communication with the at least one connection drive assembly to selectively manipulate the at least one connection drive assembly.

18 Claims, 19 Drawing Sheets

(51) Int. Cl.
*F16H 48/22* (2006.01)
*F16H 48/32* (2012.01)
*F16H 48/34* (2012.01)

(56) References Cited

U.S. PATENT DOCUMENTS

| | | | |
|---|---|---|---|
| 1,462,879 A | | 7/1923 | Woodward |
| 1,515,916 A | | 11/1924 | Woodward |
| 1,723,901 A | | 8/1929 | Todd |
| 2,121,254 A | | 6/1938 | Meinke |
| 4,043,224 A | * | 8/1977 | Quick ..................... F16H 48/08 475/237 |
| 4,719,817 A | | 1/1988 | Azuma |
| 5,562,561 A | | 10/1996 | Gillard |
| 6,394,927 B1 | | 5/2002 | Bongard |
| 6,432,020 B1 | | 8/2002 | Rivera et al. |
| 6,432,021 B1 | * | 8/2002 | Averill ................... B60K 17/35 475/237 |
| 6,561,939 B1 | * | 5/2003 | Knapke ................... F16D 28/00 192/84.6 |
| 7,264,569 B2 | | 9/2007 | Fox |
| 8,911,322 B2 | | 12/2014 | McMillan et al. |
| 9,212,704 B2 | | 12/2015 | Andonian et al. |
| 2005/0009662 A1 | * | 1/2005 | Sudou ..................... F16H 48/08 475/231 |
| 2007/0225106 A1 | * | 9/2007 | Veldman ................. F16H 48/34 475/231 |
| 2012/0244987 A1 | | 9/2012 | Haugeberg |
| 2014/0110211 A1 | | 4/2014 | Andonian et al. |
| 2015/0107933 A1 | | 4/2015 | Gopal et al. |
| 2016/0361998 A1 | * | 12/2016 | Zhao ...................... F16H 48/08 |
| 2018/0119792 A1 | | 5/2018 | Vuksa |

FOREIGN PATENT DOCUMENTS

| | | |
|---|---|---|
| GB | 256112 A | 8/1926 |
| WO | 2016023083 A1 | 2/2016 |
| WO | 2017027594 A1 | 2/2017 |
| WO | 2017083821 A1 | 5/2017 |

OTHER PUBLICATIONS

U.S. Patent and Trademark Office, "Restriction Requirement", U.S. Appl. No. 15/794,963, dated Jan. 2, 2019, pp. 17, Published: US.
U.S. Patent and Trademark Office, "Notice of Allowance", U.S. Appl. No. 15/794,963, dated Apr. 1, 2020, pp. 15, Published: US.
U.S. Patent and Trademark Office, "Office Action", U.S. Appl. No. 15/794,963, dated May 16, 2019, pp. 1-27, Published: US.
U.S. Patent and Trademark Office, "Final Office Action", U.S. Appl. No. 15/794,963, dated Oct. 31, 2019, pp. 123, Published: US.
U.S. Patent and Trademark Office, "Advisory Action", U.S. Appl. No. 15/794,963, dated Jan. 24, 2020, pp. 1-4, Published: US.
International Bureau, "International Preliminary Report on Patentability from PCT Application No. PCT/US2019/029433", from Foreign Counterpart to U.S. Appl. No. 16/396,169, dated Nov. 5, 2020, p. 1 through 15, Published: WO.

* cited by examiner

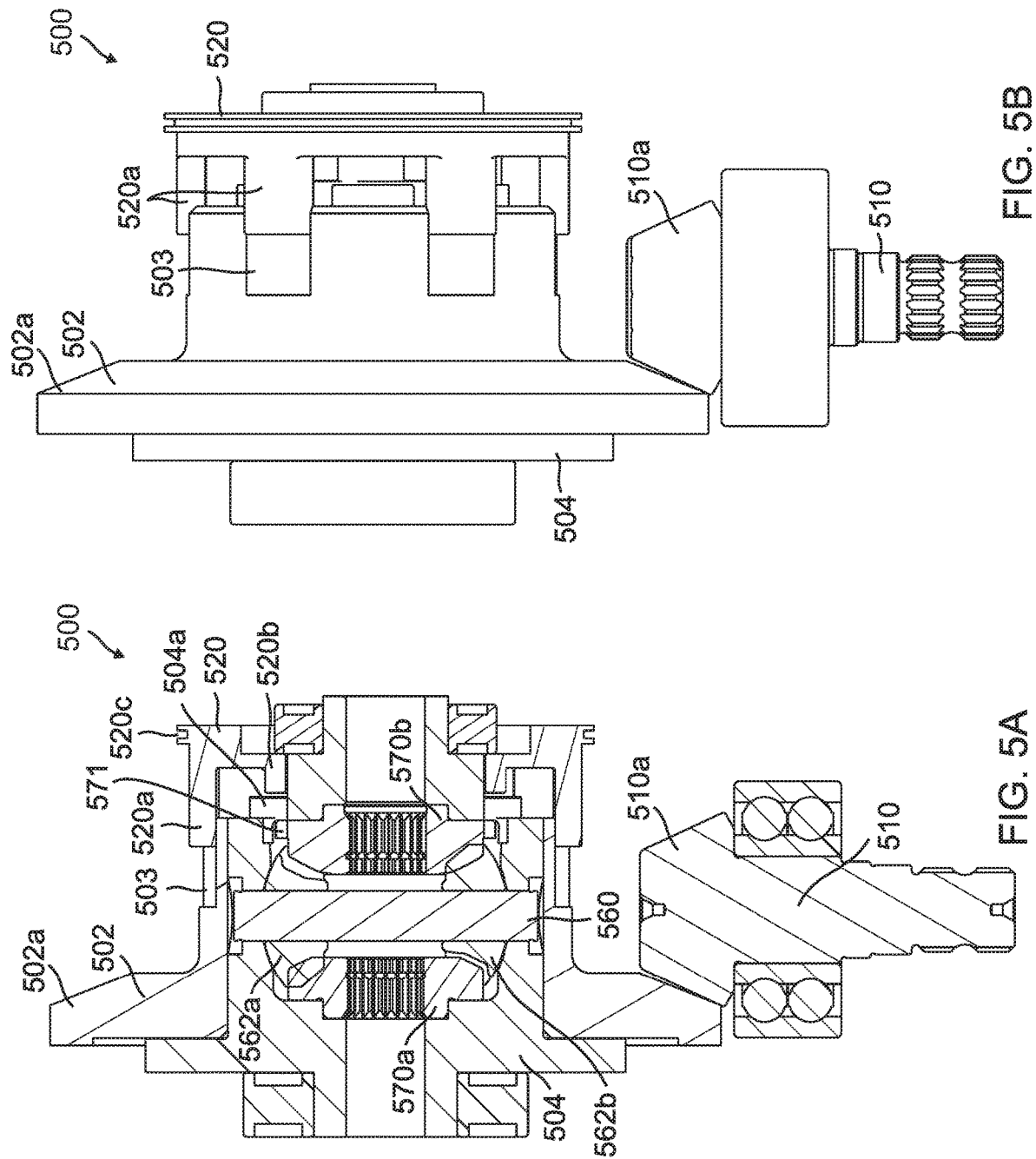

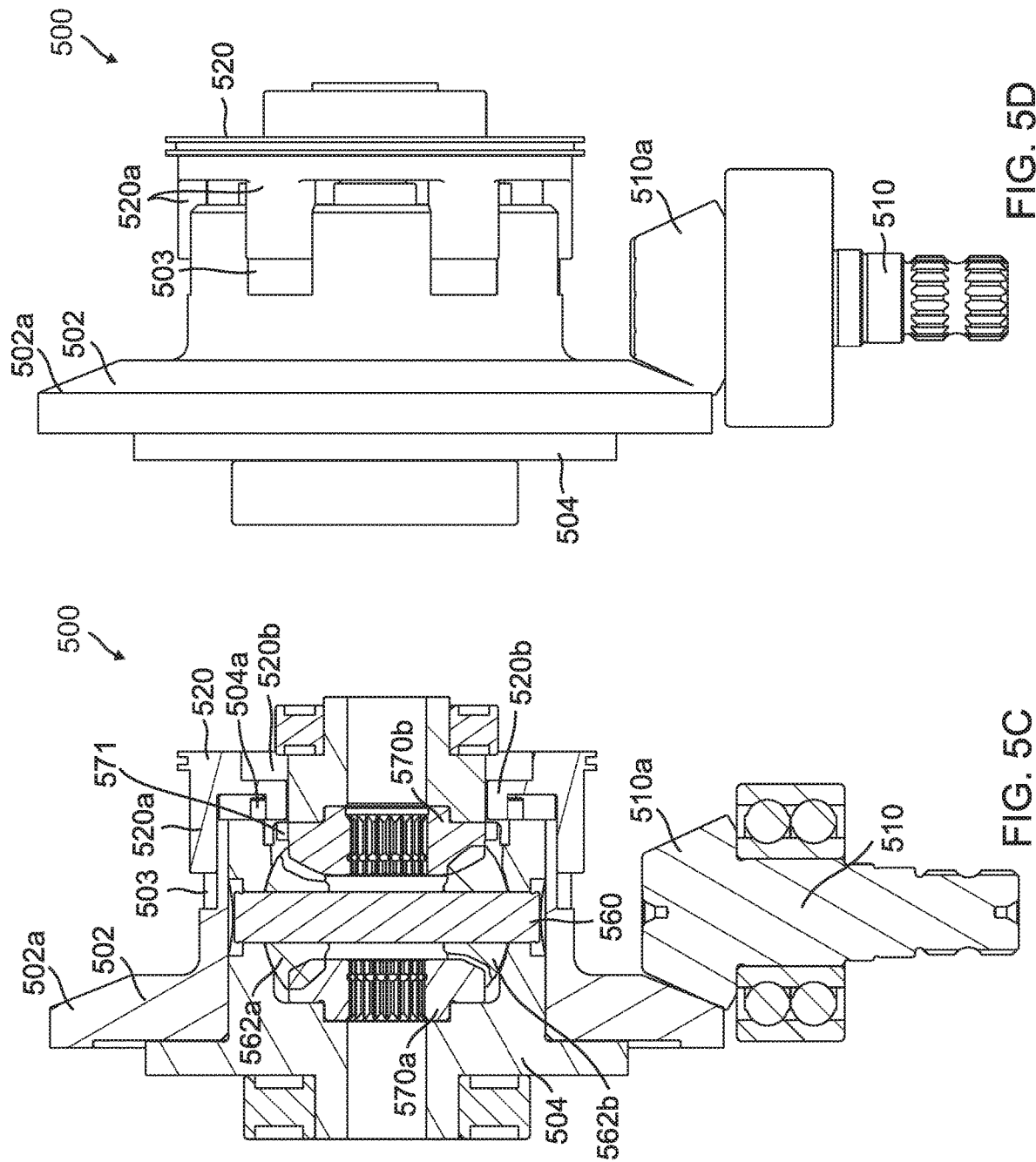

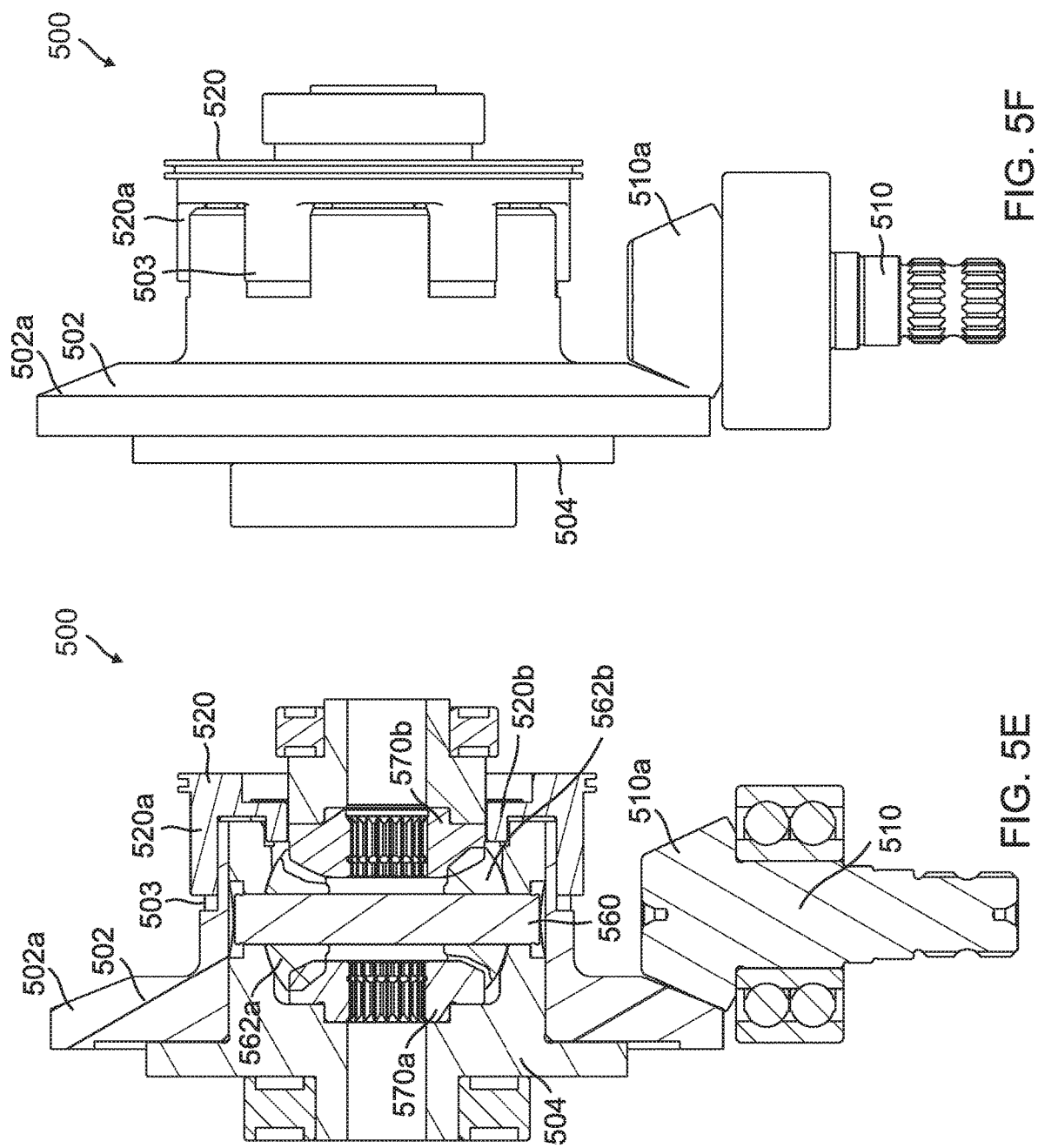

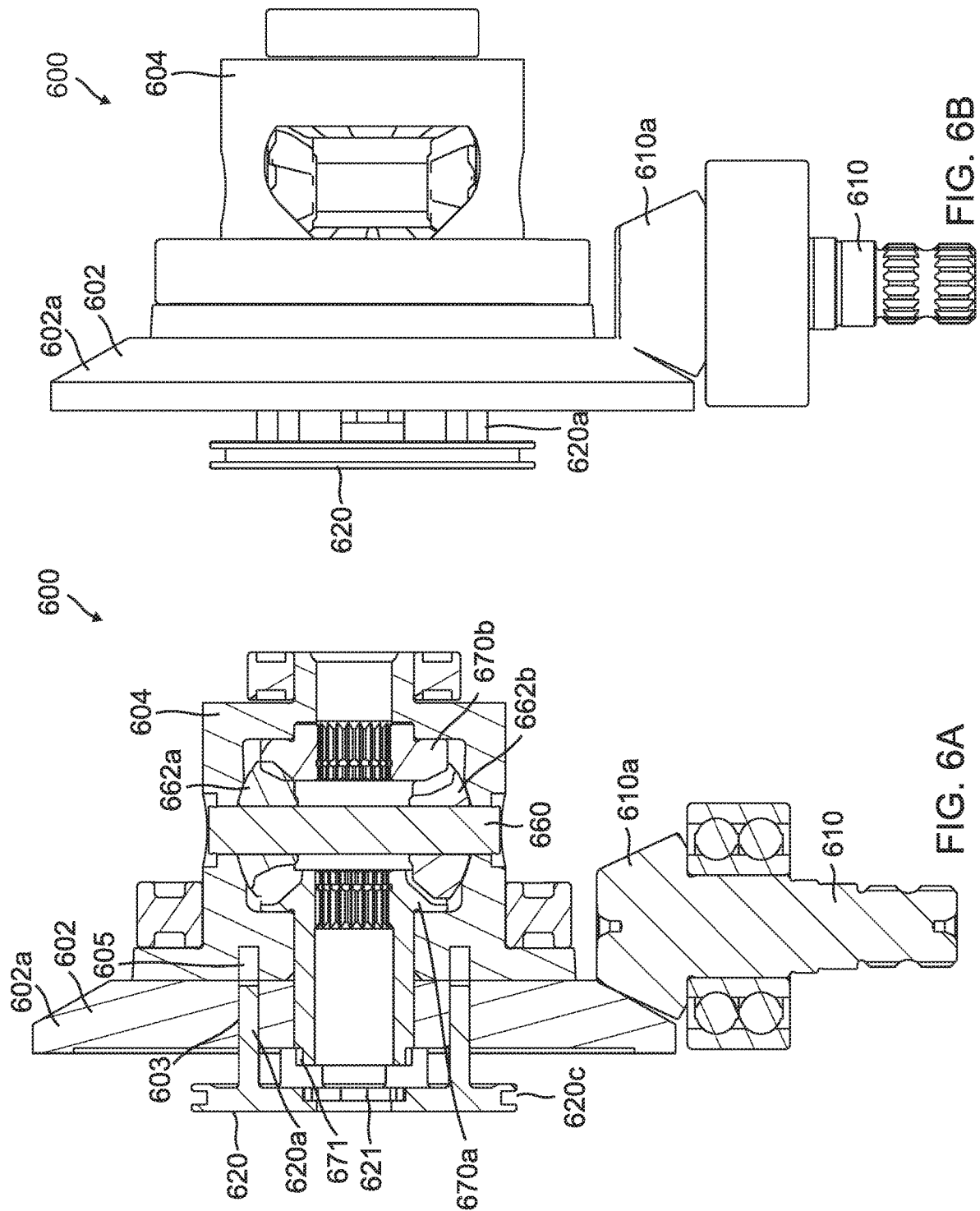

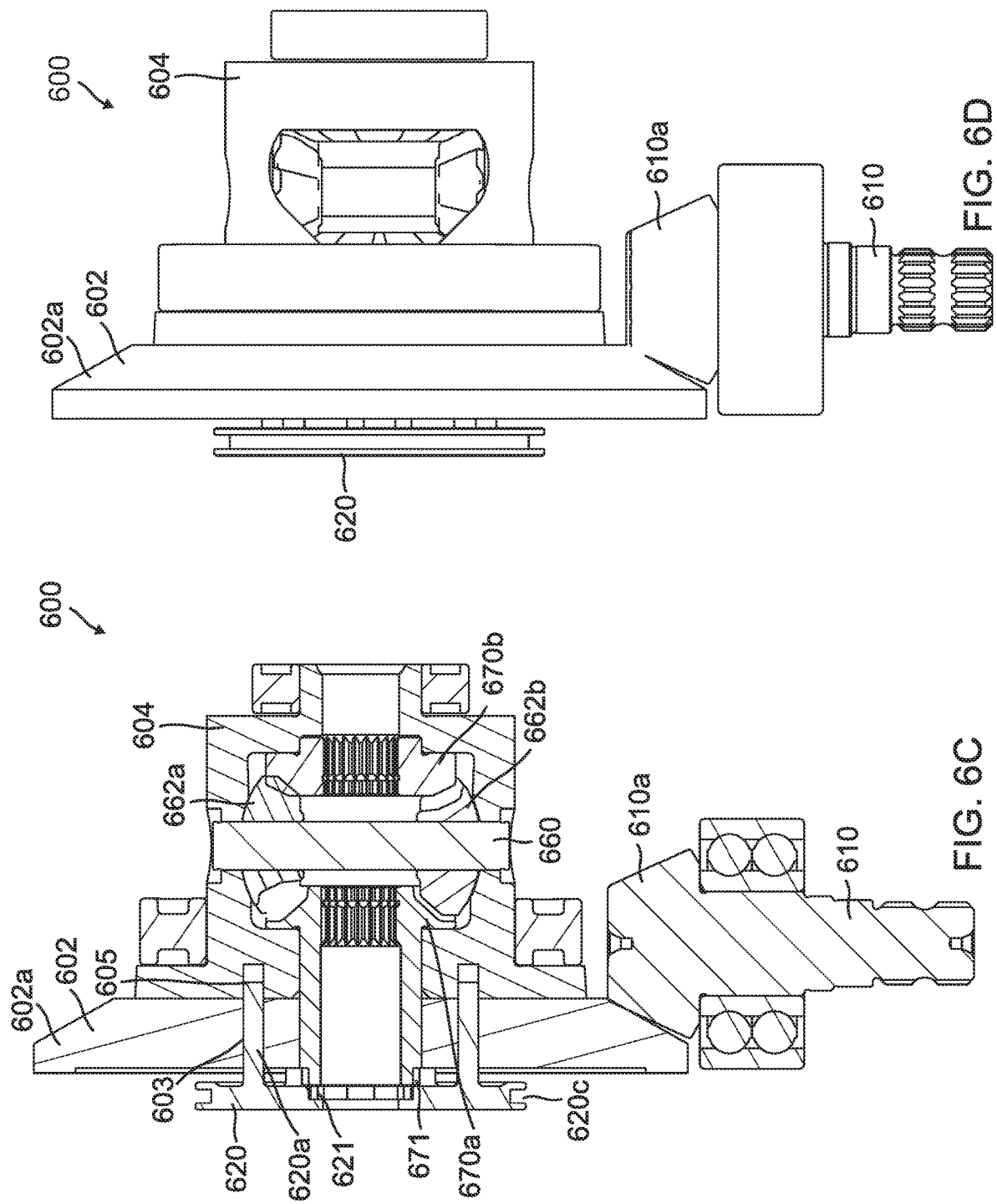

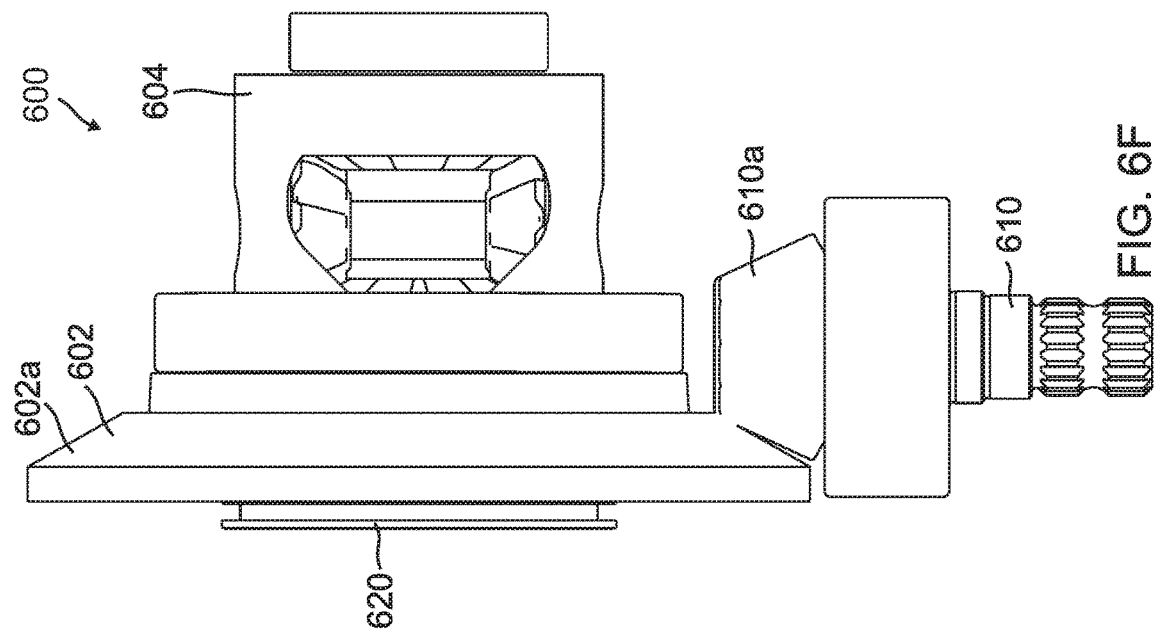
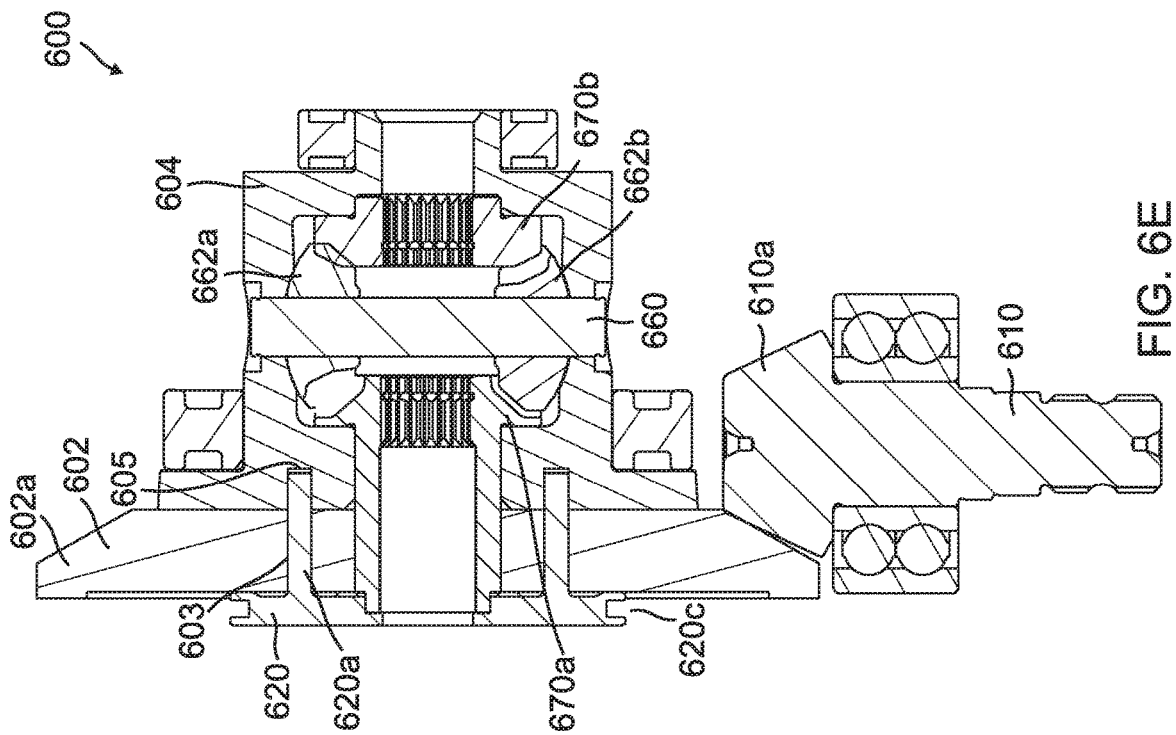

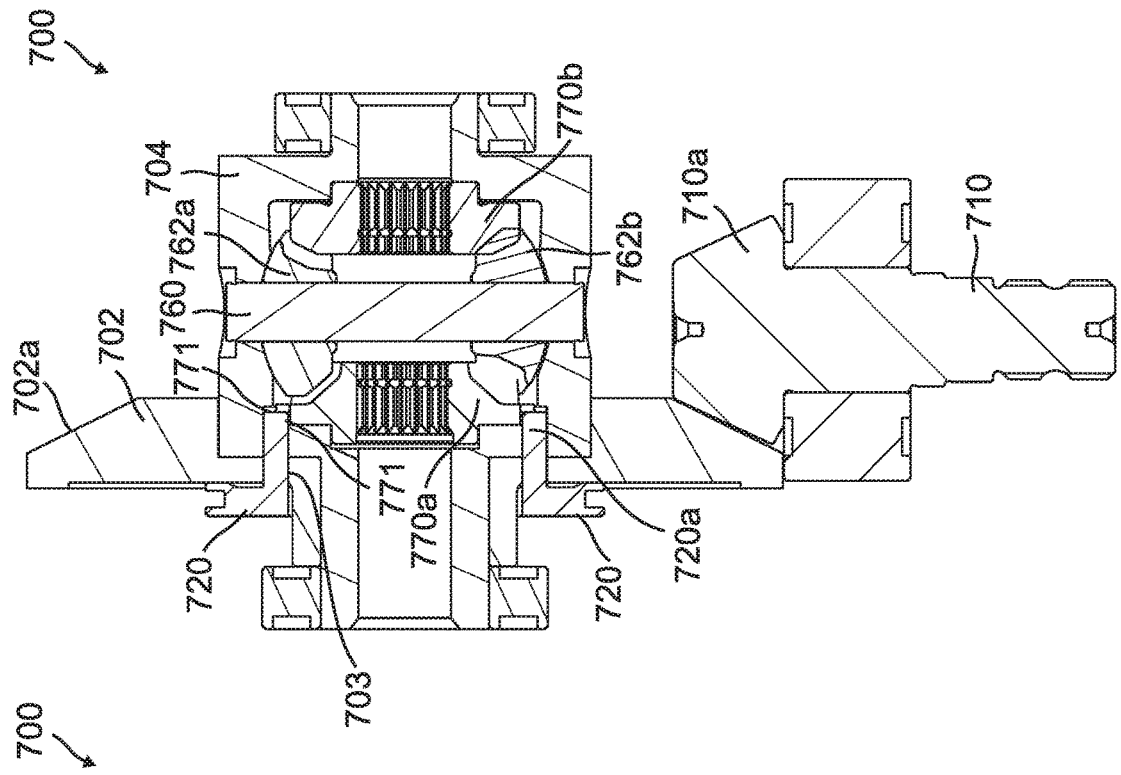
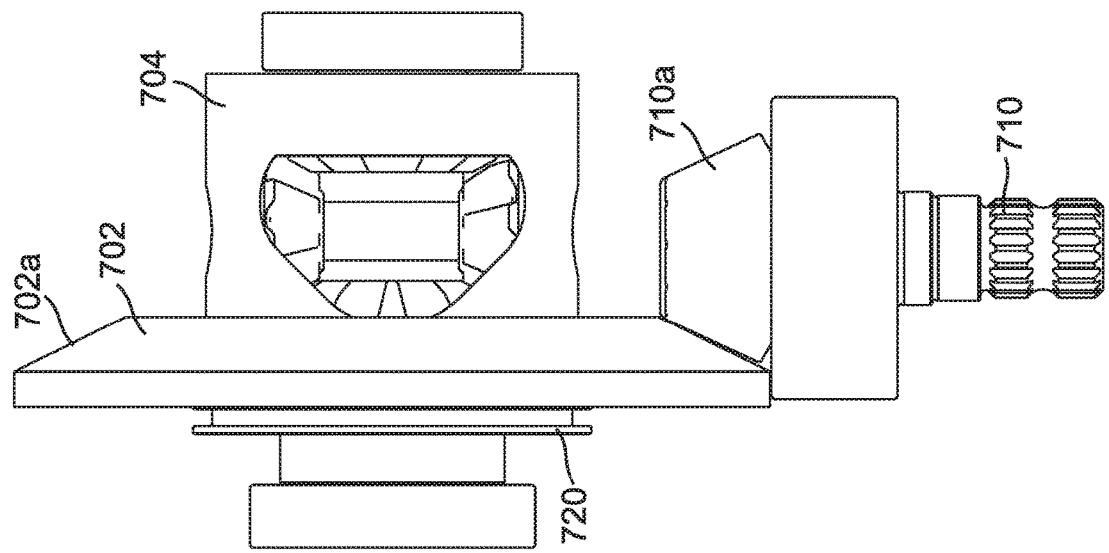
FIG. 7F
FIG. 7E

LOCKING ANGLE GEAR BOX

CROSS-REFERENCE TO RELATED APPLICATIONS

This Application claims priority to U.S. Provisional Application Ser. No. 62/663,221, entitled "Locking Differential," filed on Apr. 26, 2018 which is incorporated in its entirety herein by reference.

BACKGROUND

A traditional approach to transmit power from a transmission to front wheels of a vehicle is through a differential. A typical differential is either of bevel gear or spur gear variety that is operationally coupled through one or more gear sets to right and left front wheels. Differentials have been developed to selectively disconnect torque to one or both front wheels so the user can select optimal operating characteristics based on a vehicle's current operating conditions.

There are a few different types of differentials. One type is an open or standard differential. In a standard differential, torque is sent to the wheel that is encountering the least resistance or traction. The standard differential works well when both wheels have good traction, but when one wheel is on a low traction surface (i.e. ice, sand, gravel etc.) very little torque can be applied to the wheel that may have higher traction and any four wheel drive benefit is mitigated. Another type of differential is a limited slip differential. With a limited slip differential, torque is biased to the wheel with greater traction.

In mild off-road conditions, it is advantageous to have a limited slip differential that gradually and continuously transfers torque across the differential to the front wheel with the greatest traction. When both wheels have traction, ideally no torque is transferred and steering is unaffected with the limited slip differential.

In severe off-road conditions, it is advantageous to have both wheels rotatably locked together, ensuring maximum torque transfer to the wheel with the greatest traction. In this case, vehicle traction capability is maximized at the expense of handling and steering labor.

During non-off road conditions it may be advantageous to disconnect the torque from both front wheels to maximize handling and steering. Another situation in which a disconnected configuration may be use is when it is desired to protect the surface (i.e. turf) the vehicle is driving across.

SUMMARY

The following summary is made by way of example and not by way of limitation. It is merely provided to aid the reader in understanding some of the aspects of the subject matter described. Embodiments provide a locking differential that is compact, efficient, robust and reliable.

In one embodiment, an angle gear box is provided. The angle gear box includes a torque transfer assembly, a ring gear, at least one connection drive assembly and an actuator. The torque transfer assembly is configured to communicate torque between the torque transfer assembly and a pair of outputs to halfshafts. The ring gear is rotationally supported on the torque transfer assembly. The ring gear is configured to transfer torque between at least a portion of a driveline and the torque transfer assembly. The at least one connection drive assembly is configured to selectively lock rotation of the torque transfer assembly with the rotation of the ring gear to selectively couple torque between the torque transfer assembly and the ring gear. The actuator is in communication with the at least one connection drive assembly to selectively manipulate the at least one connection drive assembly.

In another embodiment, another locking differential is provided. The locking differential includes a carrier, a differential gearing, a ring gear, a lock drive dog assembly, a disconnect drive dog assembly and at least one actuator. The carrier having at least one carrier connection passage. The differential gearing is housed within the carrier. The ring gear is rotationally mounted on the carrier. The ring gear has at least one ring gear connection passage. The lock drive dog assembly has at least one lock engaging member that is configured to selectively engage the differential gearing in the carrier to selectively lock the differential gearing. The disconnect drive dog assembly has at least one disengaging/engaging member received in at least one passage through one of the ring gear and the carrier. The at least one disengaging/engaging member is further configured to be selectively received in at least one bore of one of the other ring gear and carrier to selectively lock rotation of the carrier with the rotation of the ring gear. The at least one actuator is used to selectively manipulate the lock drive dog assembly and the disconnect drive dog assembly.

In yet another embodiment, a vehicle including a front locking differential is provided. The vehicle includes a motor to generate torque, at least a portion of a driveline and the front locking differential. The portion of a driveline is configured to convey the torque to the front locking differential, a pair of rear wheels and a pair of front wheels. The front locking differential includes a carrier, a ring gear, at least one connection drive assembly and an actuator. The carrier is configured to communicate torque between the carrier and a pair of halfshafts. The ring gear is rotationally mounted on the carrier. The ring gear is configured to transfer torque between at least a portion of a driveline and the carrier. The at least one connection drive assembly is configured to selectively lock rotation of the ring gear with the rotation of the carrier to selectively couple torque between the ring gear and the carrier. The actuator is in communication with the at least one connection drive assembly to selectively manipulate the at least one connection assembly. Each front wheel is in rotational communication with a respective halfshaft of the pair of halfshafts.

BRIEF DESCRIPTION OF THE DRAWINGS

Embodiments can be more easily understood and further advantages and uses thereof will be more readily apparent, when considered in view of the detailed description and the following figures in which:

FIG. 5A is a cross-sectional side view of another locking differential in a two wheel drive configuration according to one exemplary embodiment;

FIG. 5B is a side view of the locking differential of FIG. 5A in the two wheel drive configuration;

FIG. 5C is a cross-sectional side view of the locking differential of FIG. 5A in a four wheel drive configuration;

FIG. 5D is a side view of the locking differential of FIG. 5A in the four wheel drive configuration;

FIG. 5E is a cross-sectional side view of the locking differential of FIG. 5A in a four wheel lock configuration;

FIG. 5F is a side view of the locking differential of FIG. 5A in the four wheel drive lock configuration;

FIG. 6A is a cross-sectional side view of another locking differential in a two wheel drive configuration according to one exemplary embodiment;

FIG. 6B is a side view of the locking differential of FIG. 6A in the two wheel drive configuration;

FIG. 6C is a cross-sectional side view of the locking differential of FIG. 6A in a four wheel drive configuration;

FIG. 6D is a side view of the locking differential of FIG. 6A in the four wheel drive configuration;

FIG. 6E is a cross-sectional side view of the locking differential of FIG. 6A in a four wheel drive lock configuration;

FIG. 6F is a side view of the locking differential of FIG. 6A in the four wheel drive lock configuration;

FIG. 7E is a side view of the locking differential of FIG. 7A in a four wheel drive lock configuration;

FIG. 7F is a cross-sectional side view of the locking differential of FIG. 7A in the four wheel drive lock configuration.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a locking angle gear box such as, but not limited to, a locking differential or locking spool, that selectively couples torque between a portion of the driveline and wheels. In some embodiments a singular mechanism is used to selectively couple the torque. Further, some embodiments do not require a separate disconnection device that decouples the drive from the transmission. Moreover, some embodiments provide both open and limited slip differentiation configurations. Configuration selection of the locking differential in embodiments may be automatically or manually actuated. In embodiments, a ring gear selectively rotates freely with respect to an associated differential carrier or spool (generally referred to as torque transfer assemblies). In some of the embodiments, at least one engaging member of at least one connection drive assembly is selectively passed through the ring gear and into the differential carrier and further into the side gear to achieve different drive configurations.

Figure 1A:
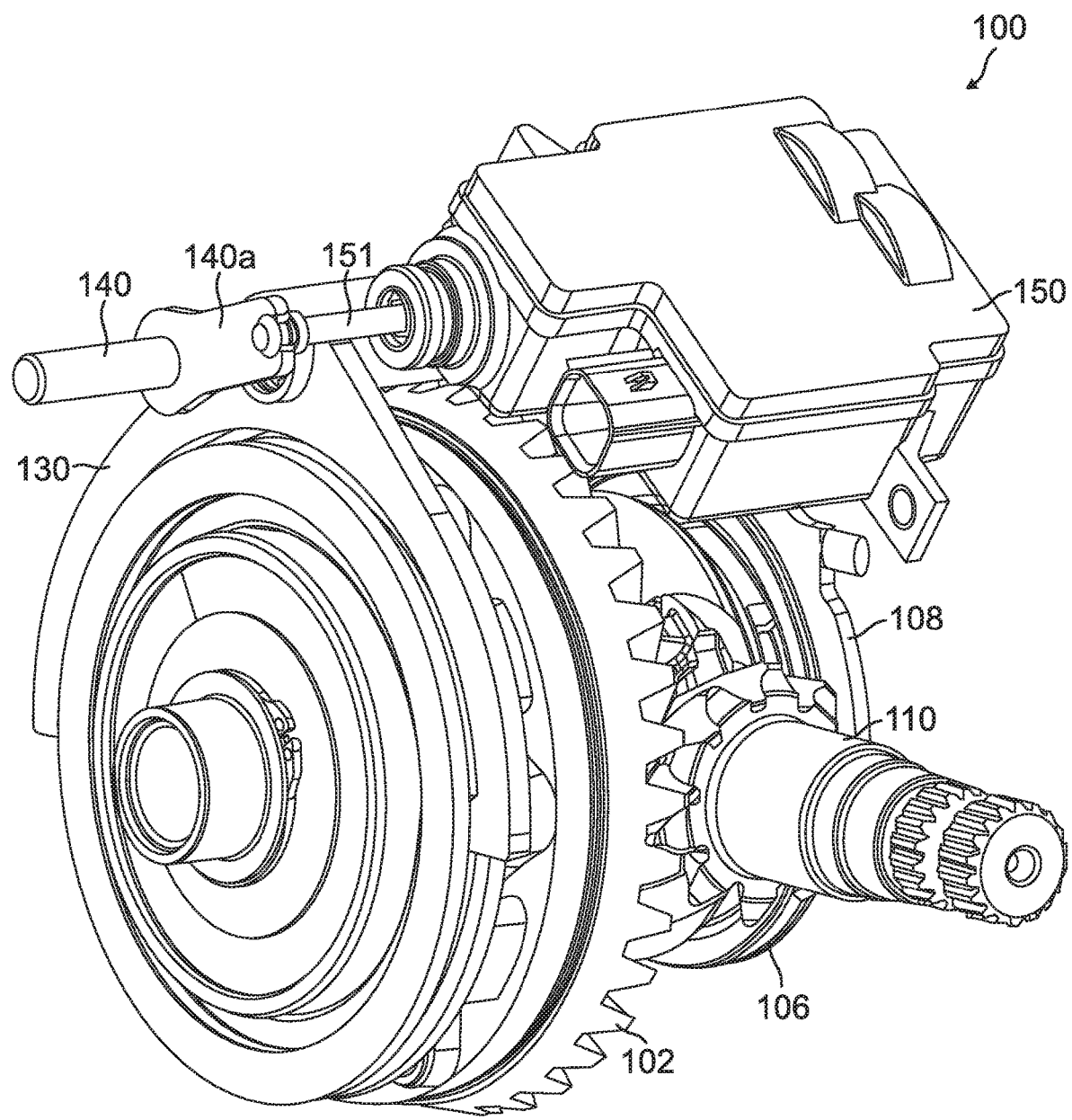
FIG. 1A is a side perspective view of a locking differential according to one exemplary embodiment.
Figure 1B:
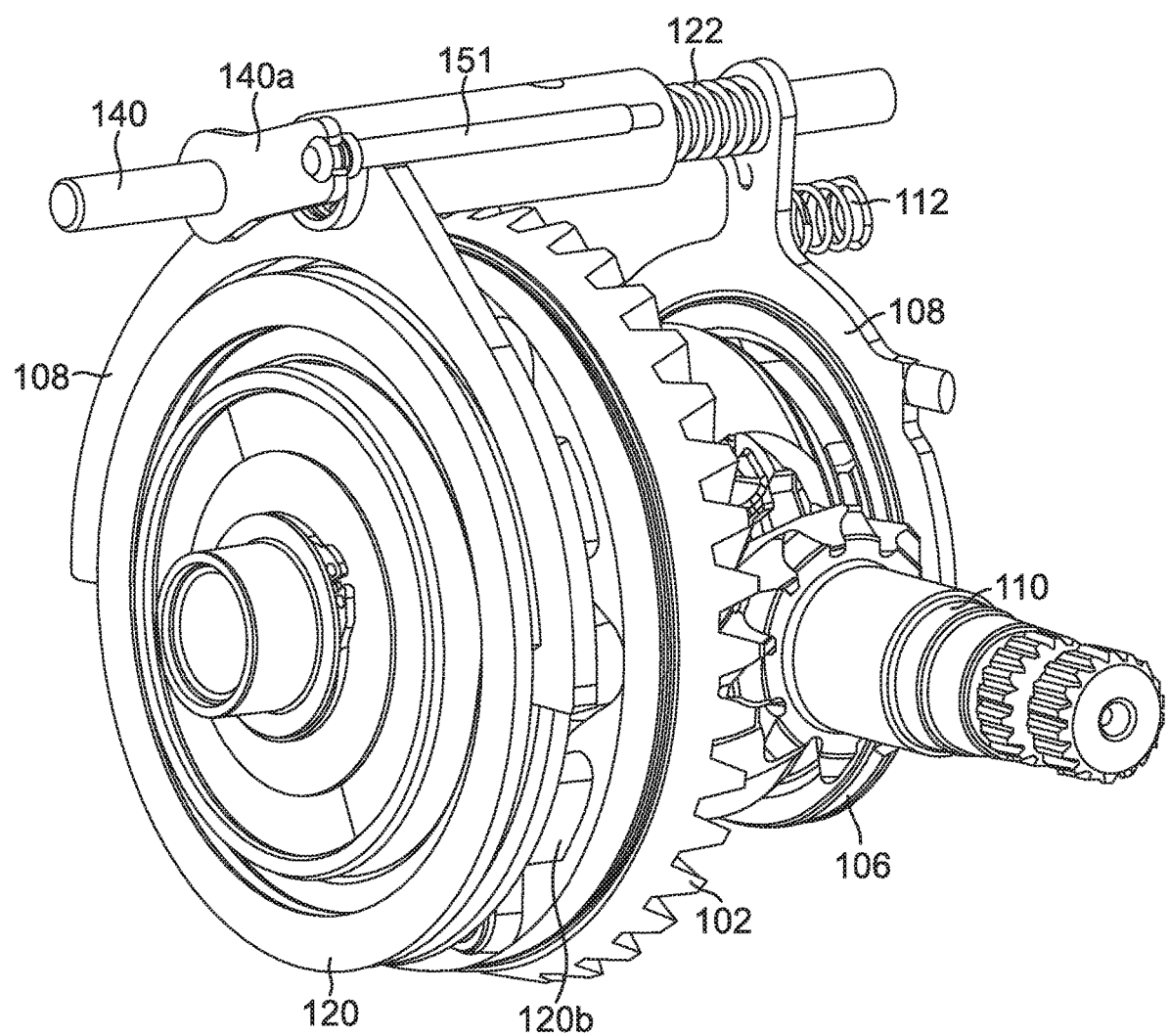
FIG. 1B is a side perspective view of the locking differential of FIG. 1A illustrated without an actuator.
Figure 1C:
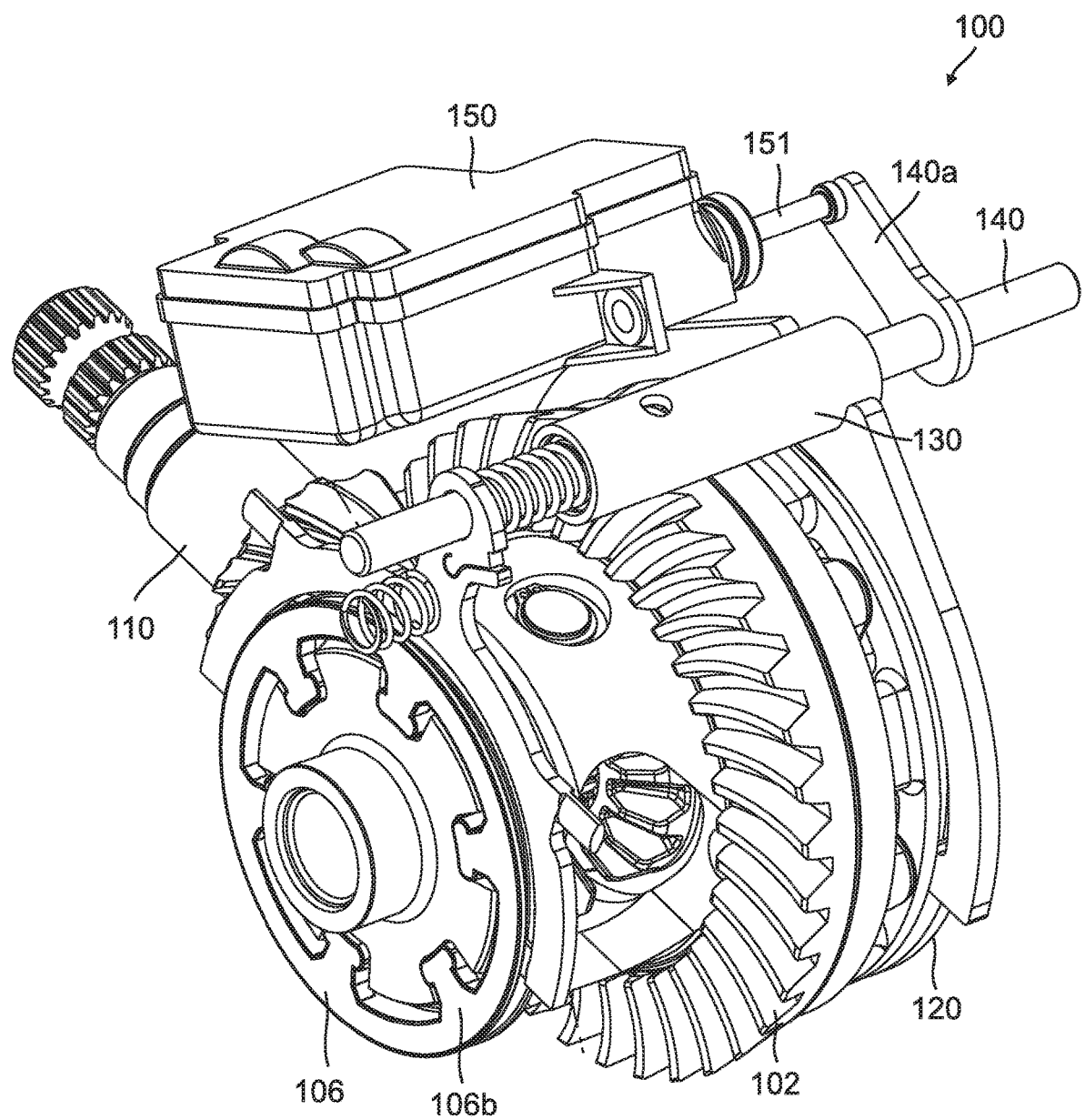
FIG. 1C is a side perspective view of the locking differential of FIG. 1A.
Figure 2:
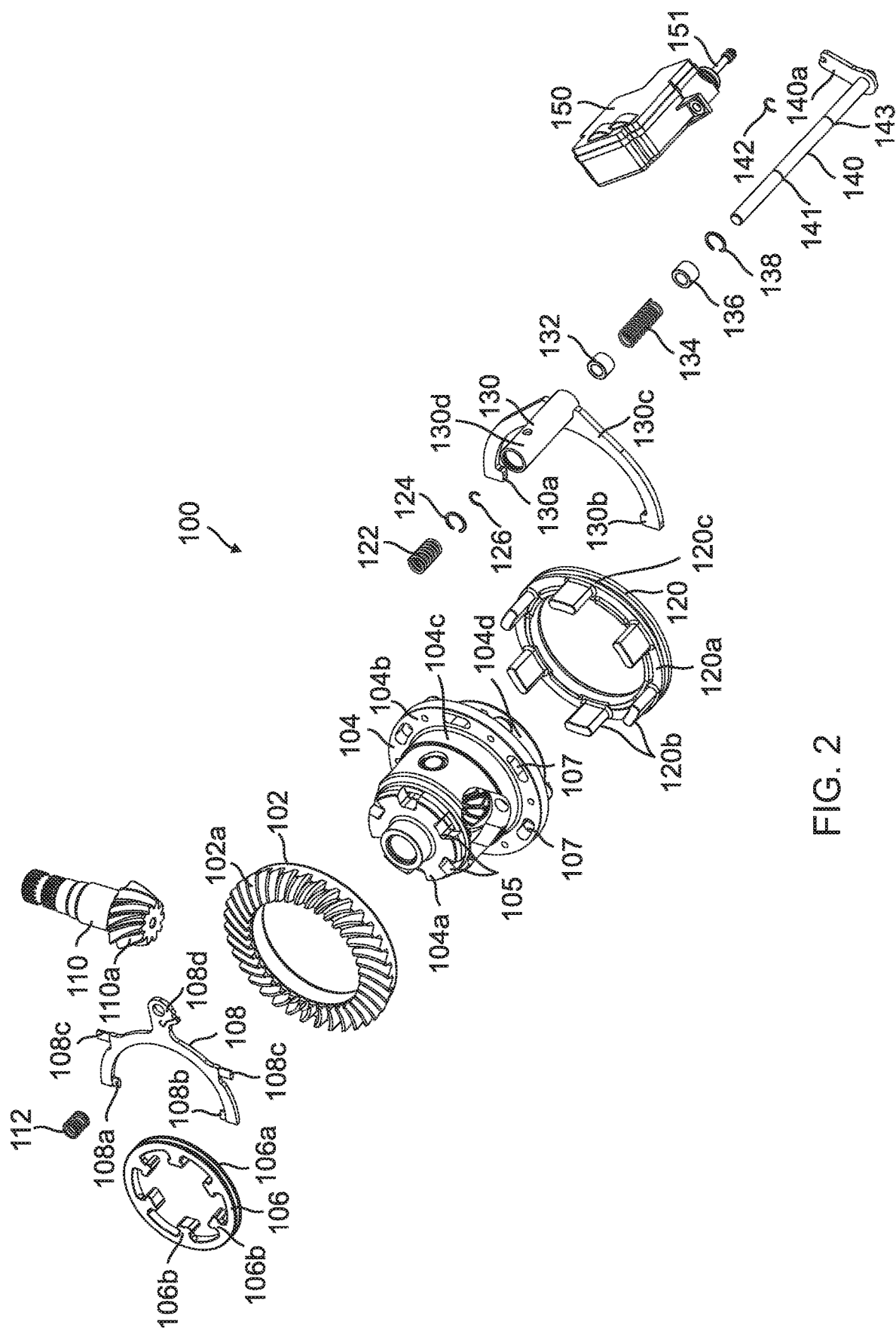
FIG. 2 is an unassembled side-perspective view of the locking differential of FIG. 1A.
Figure 3A:
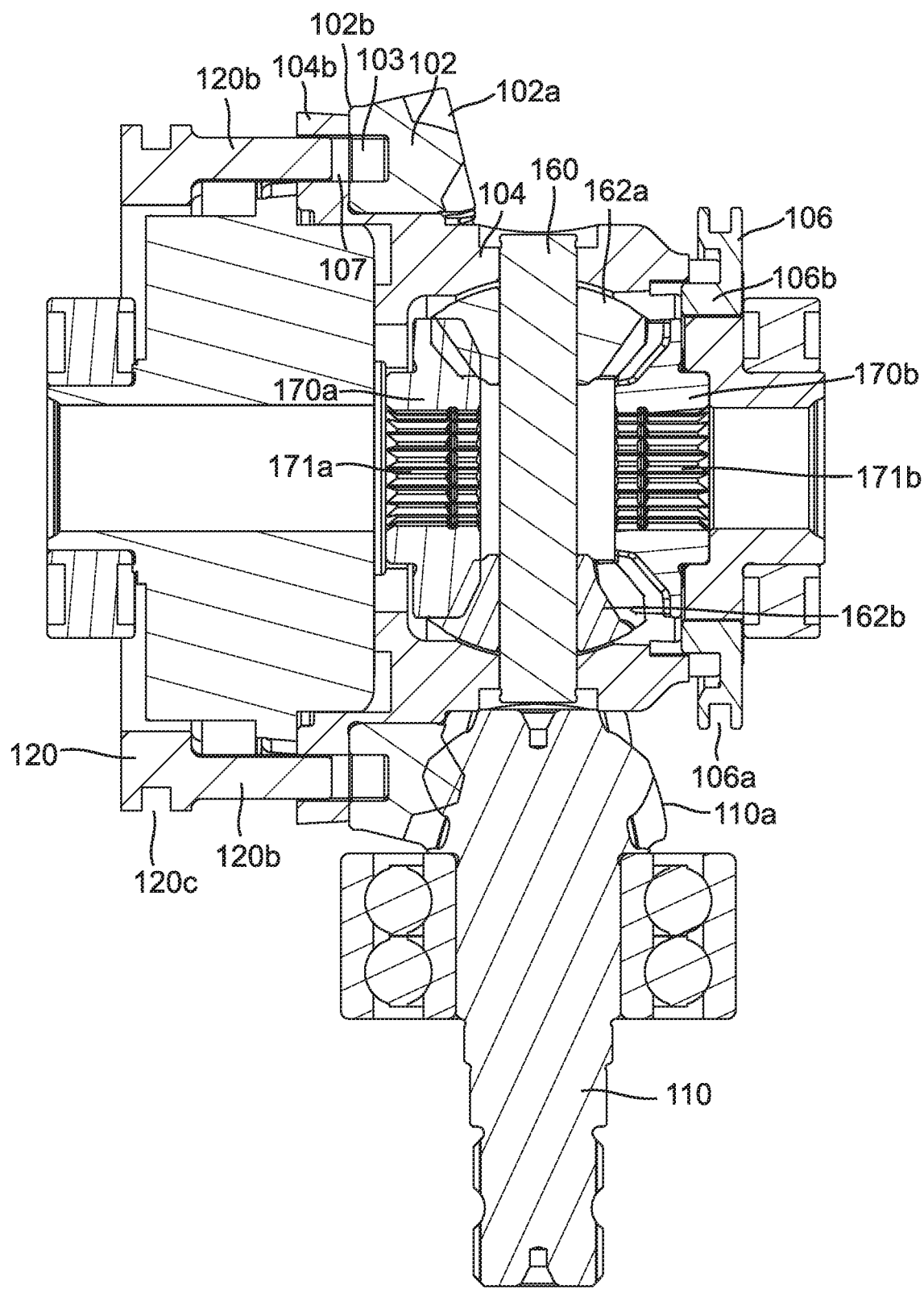
FIG. 3A is a cross-sectional side view of the locking differential of FIG. 1A illustrating a two wheel drive configuration.
Figure 3B:
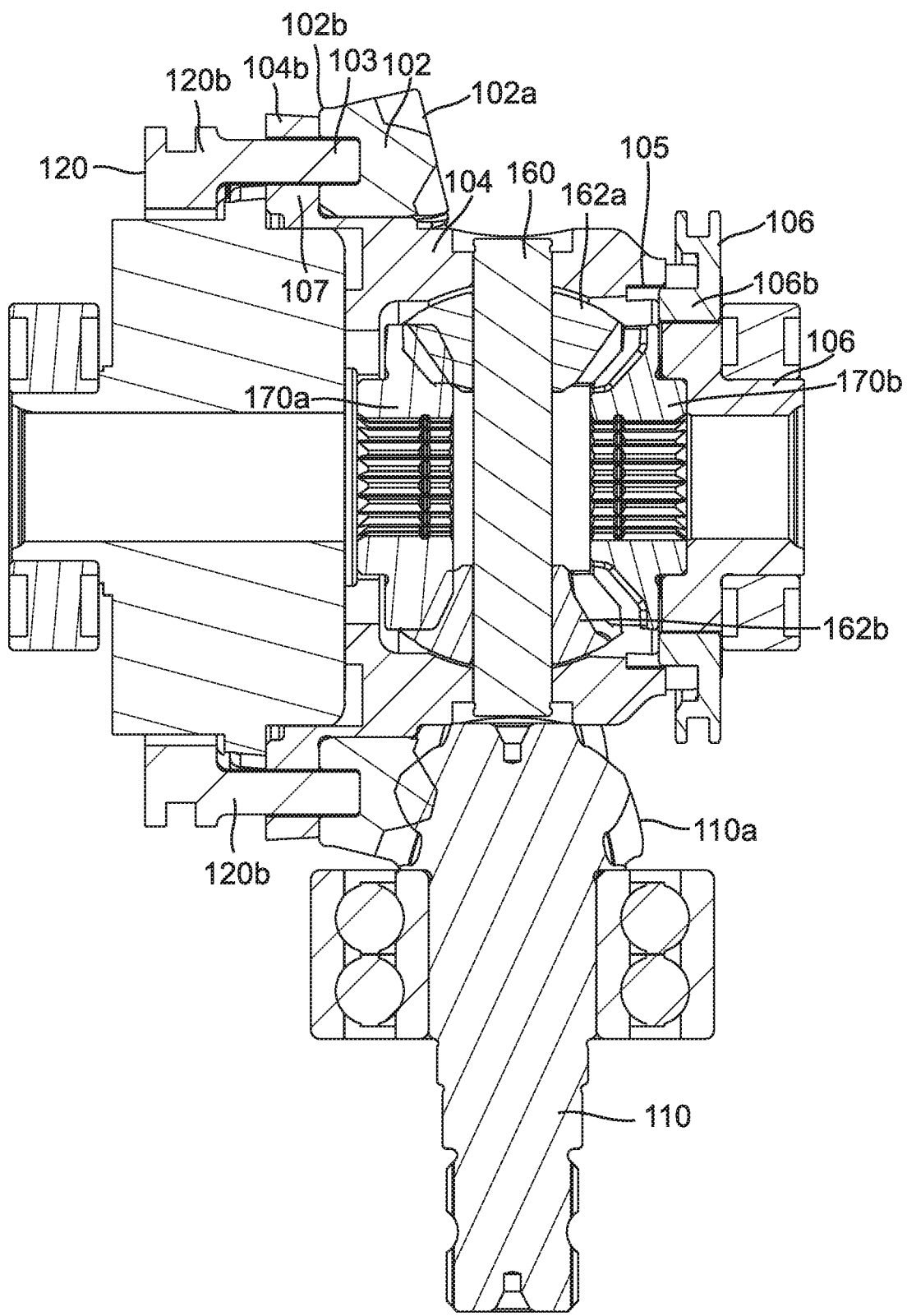
FIG. 3B is a cross-sectional side view of the locking differential of FIG. 1A illustrating a four wheel drive configuration.
Figure 3C:
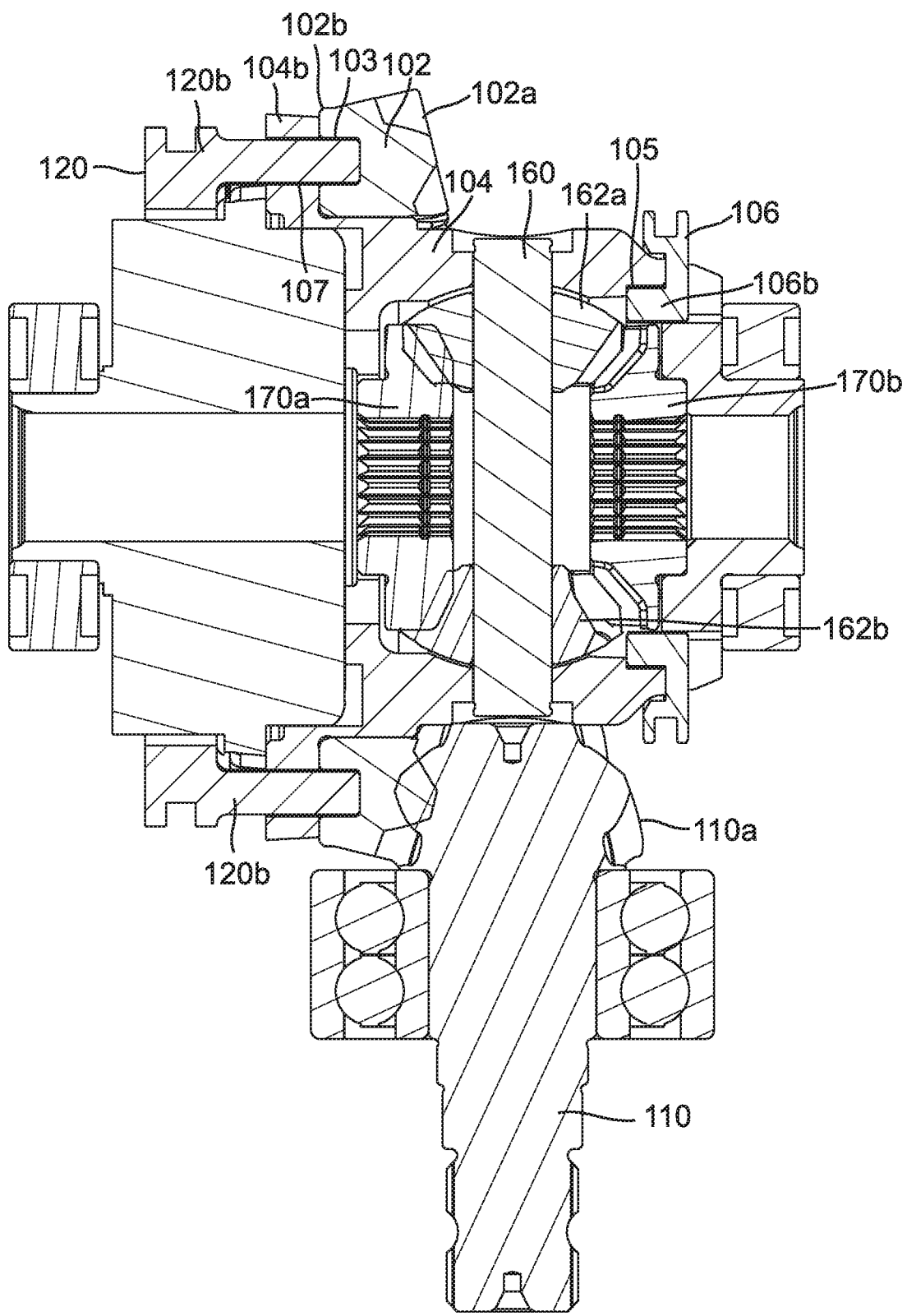
FIG. 3C is a cross-sectional side view of the locking differential of FIG. 1A illustrating a four wheel drive lock configuration.

FIGS. 1A through 3C illustrate a first embodiment of a locking differential 100. In particular, FIGS. 1A through 1C illustrate assembled views of the locking differential 100, FIG. 2 illustrates an unassembled view of the locking differential 100 and FIGS. 3A through 3C illustrate cross-sectional views of the locking differential 100 in different configurations.

As best illustrated in FIG. 2, the locking differential 100 in this example embodiment includes a ring gear 102 and a carrier 104 (torque transfer assembly). In a typical ring gear/carrier arrangement, the ring gear 102 is solidly coupled to the carrier 104. However, in this embodiment, the ring gear 102 is a floating ring gear that selectively rotates in relation to the carrier 104 about a ring gear seat 104c of the carrier 104. The carrier 104 includes a carrier collar 104b that includes a plurality of spaced collar disconnect passages 107. The carrier 104 further includes a lock member portion 104a. Within the lock member portion 104a are a plurality of spaced lock member passages (or slots) 105 that are positioned about an outer parameter of the lock member portion 104a of the carrier 104.

Within the carrier 104 is housed differential gearing as best illustrated in FIGS. 3A through 3B. The differential gearing includes a differential pin 160 that is mounted within the carrier 104. On opposite end of the differential pin 160 are rotationally mounted carrier pinion gears 162a and 162b. The differential gearing further includes side gears 170a and 170b. The side gears 170a and 170b include inner splines (connections) designed to engage outer splines of halfshafts (not shown in these Figures). The halfshafts in turn are coupled to wheels, such as, but not limited to front wheels of a vehicle. The side gears 170a and 170b engage the pinion gears 162a and 162b to transfer torque between the locking differential 100 and respective wheels as described in detail below. Embodiments are not limited to the pinion/side gear differential gearing configuration described above. Any configuration that provides differential functions may be used. For example, in a two spider design embodiment one or more pairs of carrier pinion gears may be used.

A main pinion 110 is used to transfer torque between the rest of a driveline (which may include a transmission, drive shaft, propeller shaft, transaxle, etc.) and the locking differential 100. The main pinion 110 includes a main pinion interface 110*a* that is engaged with a ring gear interface 102*a* of the ring gear 102.

Referring back to FIG. 2, the locking differential 100 of this example embodiment further includes a lock fork 108. The lock fork 108 in this example is generally C-shaped. Terminal ends of the lock fork 108 include engaging portions 108*a* and 108*b* that generally extend inward towards each other. The lock fork 108 further includes pivot members 108*c* that extend in opposite directions away from each other from an outer surface of the lock fork 108. The pivot members 108*c* are received in a housing (not shown) of locking differential 100. The pivot members 108*c* provide a pivot point in which the lock fork 108 pivots during activation as discussed below in detail. The lock fork 108 further includes a centrally located outward extending rail connecting member 108*d*. A first lock bias member 112 is positioned to provide a first bias force on the lock fork 108 discussed below.

The locking differential 100 further includes connection drive assemblies 106 and 120. In particular, connection drive assembly 106 is a lock drive dog assembly 106. The lock drive dog assembly 106 is generally ring shaped with inward extending spaced engaging members 106*b*. Engaging members 106*b* may be referred to as lock engaging members 106*b*. An outer parameter of the lock drive dog assembly 106 includes a manipulation portion 106*a* that in one embodiment includes a groove in which the engagement portions 108*a* and 108*b* of the lock fork 108 are received. The manipulation portion 106*a* may be referred to as a lock manipulation portion 106*a*. The lock drive dog assembly 106 is received around (slidably mounted on) the lock member portion 104*a* of the carrier 104 with the engaging members 106*a* of the dog lock 106 received within the lock member passages 105 (slots) in the lock member portion 104*a* of the carrier 104. The lock fork 108, under control of an actuator 150, is used to selectively move the lock drive dog assembly 106 axially on the lock member portion 104*a* of the carrier 104 which moves the engagement members 106*a* of the lock drive dog assembly 106 within the lock member passages 105 of the lock member portion 104*a* of the carrier 104 to selectively engage side gear 170*b* of the differential gearing to lock the locking differential 100 in a four wheel drive lock configuration as discussed further in regards to FIG. 3C below.

The connection drive assembly 120 in this embodiment of locking differential 100 is a disconnect drive dog assembly 120. The disconnect drive dog assembly 120 in this example embodiment is also generally ring shaped. The disconnect drive dog assembly 120 includes spaced engaging members 120*b* that generally extend from a side of a main body 120*a* of the dog disconnect 120. The engaging members 120*b* may be referred to as disengaging/engaging members 120*b*. The disconnect drive dog assembly 120 is received around (slidably mounted on) a disconnect portion 104*d* of the carrier 104 with the engaging members 120*b* of the disconnect drive dog assembly 120 being received in the disconnect passages 107 of the carrier collar 104*b* of the carrier 104. The locking differential 100 includes a manipulation portion 120*c* which is located around a perimeter of the main body 120*a* of the disconnect drive dog assembly 120. The manipulation portion 102*c* includes a groove in this embodiment. The manipulation portion 102*c* may be referred to as a disconnect manipulation portion 102*c*.

A disconnect fork 130 engages the manipulation portion 102*c* of the disconnect drive dog assembly 120. The disconnect fork 130 includes a generally C-shaped main portion 130*c* and tube portion 130*d*. The tube portion 130*d* is connected to a central location of the main portion 130*c* and extends generally in a perpendicular direction from the main portion 130*c*. The generally C-shaped portion terminates in engaging portions 130*a* and 130*b* that are designed to be received with the groove of the manipulation portion 120*c* of the disconnect drive dog assembly 120. The disconnect fork 130 selectively moves the disconnect drive dog assembly 120 on the disconnect portion 104*d* of the carrier 104 axially to move the engaging members 120*b* of the disconnect drive dog assembly 120 into and out of ring gear bores 103 (best illustrated in FIG. 3A and 3B) of the ring gear 102 to selectively lock rotation of the carrier 104 to the ring gear 102. This selectively provides two wheel drive and four wheel drive configurations as discussed below in regards to FIGS. 3A and 3B.

The lock fork 108 and the disconnect fork 130 are coupled to the shift rod 140 as best illustrated in FIG. 2. A second lock bias spring 112 is received around the end of the shift rod 140 and is positioned with retaining ring 124 to assert a second biasing force on the rail connecting member 108*d* of the lock fork 108 to bias the lock fork 108 in a desired pivot position. The tube portion 130*d* of the disconnect fork 130 is received around a portion of the shift rod 140. Between the tube portion 130*d* and the shift rod 140 is positioned bushing 132, disconnect biasing spring 134, retaining clip 124, retaining clip 138 and bushing 136. Retaining clips 124 and 138 engage an interior surface of the tube portion 103*d* at spaced select locations. The tube portion 103*d* is retained axially along the shift rod via retaining stop clips 126 and 142 that are respectively received in holding grooves 141 and 143 in the shift rod 140. The disconnect biasing spring 134 is positioned to assert a biasing force on the tube portion 130*d* of the disconnect fork 130 so the disconnect drive dog assembly 120 in a desired position. A shift rod connecting member 140*a* connects the shift rod 140 to an actuating rod 151 of an actuator 150. In this embodiment a signal actuator 150 may be used to change the locking differential between two wheel drive, four wheel drive and four wheel drive lock configurations as described below. The actuator 150 may be any type of actuating device that can move the shift rod 140 including, but not limited to, an electric actuator, a hydraulic actuator and a manual actuator.

Operation of the locking differential 100, as well as other embodiments of locking angle gear boxes described below, are described as being applied to a front differential with the different configurations generally described as two wheel drive (2WD), four wheel drive (4WD) and four wheel drive lock (4WDL). These are only example configurations. In other embodiments in which the locking angle gear boxes are not implemented in a front differential, the different configurations can generally be referred to as torque disconnected, torque connected with open or limited slip and outputs rotatably locked.

FIG. 3A illustrates the locking differential 100 in a two wheel drive (2WD) configuration (torque disconnected). In this 2WD configuration, the carrier 104 is free to rotate independent of the ring gear 102. As illustrated, the engaging portions 120*b* of the disconnect drive dog assembly 120 are located in respective disconnect passages 107 of the carrier collar 104*b* of the carrier 104 but are not positioned into the ring gear bores 103 in the ring gear 102. Hence, in this 2WD configuration torque from the remaining driveline that is applied to the main pinion 110 and the ring gear 102 is not communicated to carrier 104 and the differential gearing that is in communication with the front wheels of the vehicle. Further in this 2WD configuration, the engaging members 106b of the lock drive dog assembly 106 are not posited to engage side gear 107b. In this 2WD configuration, a vehicle provides the lowest steering effort and best fuel economy. Further, when operating a vehicle in a 2WD configuration less wear on driving surfaces such as lawns occurs. 2WD operation is typically engaged when dry obstacle free surfaces are to be encountered by the vehicle.

FIG. 3B illustrates the locking differential 100 in a four wheel drive (4WD) configuration (torque connected, open or limited slip). In this four wheel drive configuration, the carrier 104 is locked to the rotation of the ring gear 102. As illustrated, the engaging portions 120b of the disconnect drive dog assembly 120 are located in respective disconnect passages 107 of the carrier collar 104b of the carrier 104 and are positioned into the ring gear bores 103 in the ring gear 102. Hence, in this configuration torque from the remaining driveline that is applied to the main pinion 110 and the ring gear 102 is communicated to carrier 104 and the differential gearing that is in communication with the front wheels of the vehicle. Further, in this 4WD configuration, the engaging members 106b of the dog lock 106 are not positioned to engage side gear 107b so the differential gearing is allowed to perform normal differential functions that allows the front wheels to rotate at different speeds in relation to each other when needed.

Movement of the engaging portions 120b of the disconnect drive dog assembly 120 into the ring gear bores 103 in the ring gear 102 in the four wheel drive configuration is accomplished with the actuator moving the shift rod 140 a select distance in a first direction therein causing the disconnect fork 130 to move the disconnect drive dog assembly 120. A bias force provided by bias spring 112 keeps the lock fork 108 from pivoting when the shift rod 140 is positioned so the locking differential 100 is in the 4WD configuration.

The connected configuration illustrated in FIG. 3B in the 4WD configuration transfers torque to the front wheels but still allows differentiation. The differential may act as an open/standard differential or be a limited slip differential depending on the type of differential used. This 4WD configuration results in low steering effort and good high speed handling characteristics. In particular, the 4WD configuration allows for the continuous transfer of torque across the differential 100 to the wheel with the greatest traction in a limited slip differential design. In an open or standard differential configuration torque to both wheels is limited to the lesser of the torque that can be applied by a single wheel. In an embodiment, the driver makes a selection from the cockpit to go to the 4WD configuration when the vehicle is encountering low traction conditions that require torque input from the front wheels.

FIG. 3C illustrates the locking differential 100 in a four wheel drive lock (4WDL) configuration (outputs rotatably fixed). In this 4WDL configuration, the carrier 104 is locked to the rotation of the ring gear 102. As illustrated, the engaging portions 120b of the disconnect drive dog assembly 120 are located in respective disconnect passages 107 of the carrier collar 104b of the carrier 104 and are positioned into the ring gear bores 103 in the ring gear 102. Hence, in this configuration torque from the remaining driveline that is applied to the main pinion 110 and the ring gear 102 is communicated to carrier 104 and the differential gearing that is in communication with the front wheels of the vehicle. Further in this four wheel drive lock configuration, the engaging members 106b of the lock drive dog assembly 106 are positioned to engage side gear 170b and pinion gears 162a and 162b to lock the differential gearing. This locked configuration occurs when the basing force on the lock fork 108 provided by bias spring 112 is overrun by a bias force provided by bias spring 122 which engages a surface of the tube portion 108d of the disconnect fork 130 when the shift rod 140 is moved into this locked position. In this 4WDL configuration, the locking differential behaves like a spool, maintaining equal rotational speed between the wheels.

The 4WDL configuration may be selected by the driver via a switch on the cockpit when approaching terrain that may require one hundred percent torque delivery to either the left or right front wheel. This configuration is used in extreme terrain such as terrain that includes rocks, mud or snow. In the 4WDL configuration, steering effort is increased and high speed handling quality is reduced.

Movement of the engaging members 106b of the lock drive dog assembly 106 to engage side gear 107b are positioned to engage side gear 170b is accomplished with the actuator 150 moving the shift rod 140 a select distance in the first direction therein causing the lock fork 108 to pivot which therein moves the engaging members 106b of the dog lock to engage side gear 170b to lock rotation of the differential gearing. The placement of retaining stop 142 on the shift rod 140 and the give in bias spring 134 allows the disconnect fork to move axially in relation to the shift rod 140 when the shift rod 140 has been moved by the actuator 150 into the four wheel drive lock configuration. Hence as discussed above, all three configurations of the locking differential are accomplished with one actuator 150.

In one embodiment, an automatic operation of the drive dog assemblies 106 and 120 is implemented. A digital control (not shown in FIGS. 1 though 3C) may monitor vehicle via wheel speed and steering position sensors and automatically engage any of the disconnected, connected and locked configurations. In a manual embodiment, an electronic switch in the cockpit may be used to allow the driver to select between the 2WD, 4WD and 4WDL configurations.

The engaging members of connection drive assemblies such as engaging members 106b and 120b of the respective drive dog assemblies 106 and 120 may have any desired cross-sectional shape such as, but not limited to circular, rectangular and triangular. For example the shape of the engaging members 106b and 120b are kidney shaped.

As described above, the drive dog assemblies 106 and 120 are driven by shift forks 108 and 130 that actuated by a linear actuator 150. The linear actuator 150 in an embodiment is electrically driven from a vehicles battery voltage. In one embodiment, a threaded shift rod arrangement that axially moves the respective shift forks 108 and 130 in a desired direction through the use of shift shaft 140 is used. In another embodiment, the shift forks 108 and 130 may be manually actuated via a lever and cable system. That is, in this embodiment the actuator is a manual actuator. In still other embodiments the connection drive assemblies, such drive dog assemblies 106 and 120, may be axially driven by one or more cams. The cams may be manually, electrically, hydraulically or pneumatically actuated.

During periods of high relative motion between rotating components, changing differential configuration could result in damaging dynamic loads. To prevent this from occurring, aperture geometry of passage 103 is selected such that the engaging members 106a and 120a of the drive dog assemblies 106 and 120 cannot not physically engage above a specified relative velocity. Alternatively, engagement prevention could be accomplished through digital logic.

The drive dogs assemblies 106 and 120 may be spring loaded (biased) on the shift rod 140 via spring biasing members 122 and 134 in order to maintain positive axial force in the direction of engagement until such a time that the respective passages 103 and 105 allow engagement. This allows an actuator to be depowered once the desired position of shift rod 140 has been achieved, regardless of whether the configuration change has yet occurred.

In embodiments, the selected configurations remain active until such a time that the driver decides to select an alternative configuration in a manual activation configuration or in until a controller determines that conditions indicate a change in an automatic activation configuration. Upon selecting an alternate configuration, the drive dog assemblies 106 and 120 may disengage from the current configuration.

Figures 4A, 4B:
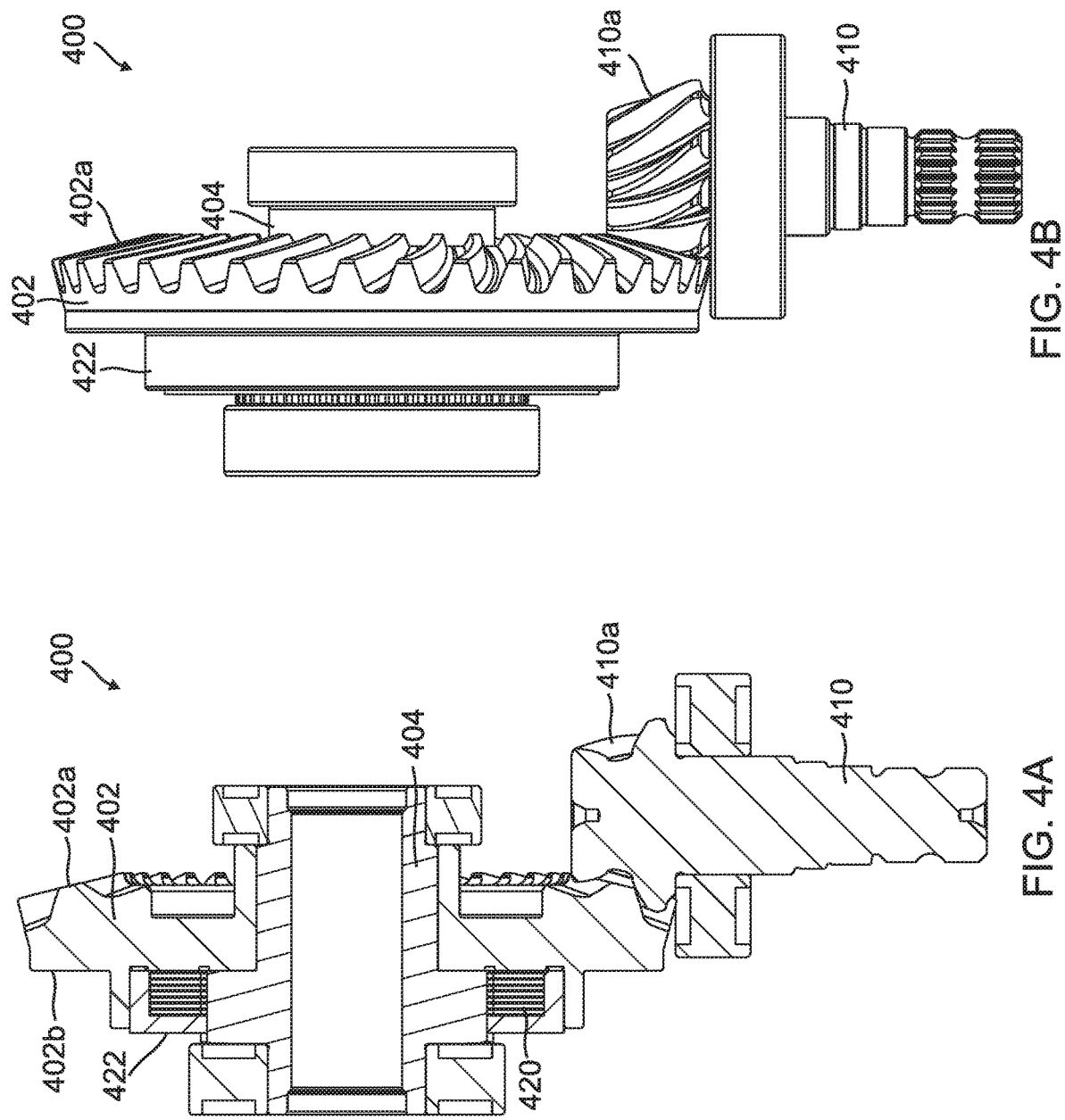
FIG. 4A is a cross-sectional side view of another locking differential according to one exemplary embodiment.
FIG. 4B is a side view of the locking differential of FIG. 4A.
Figure 4C:
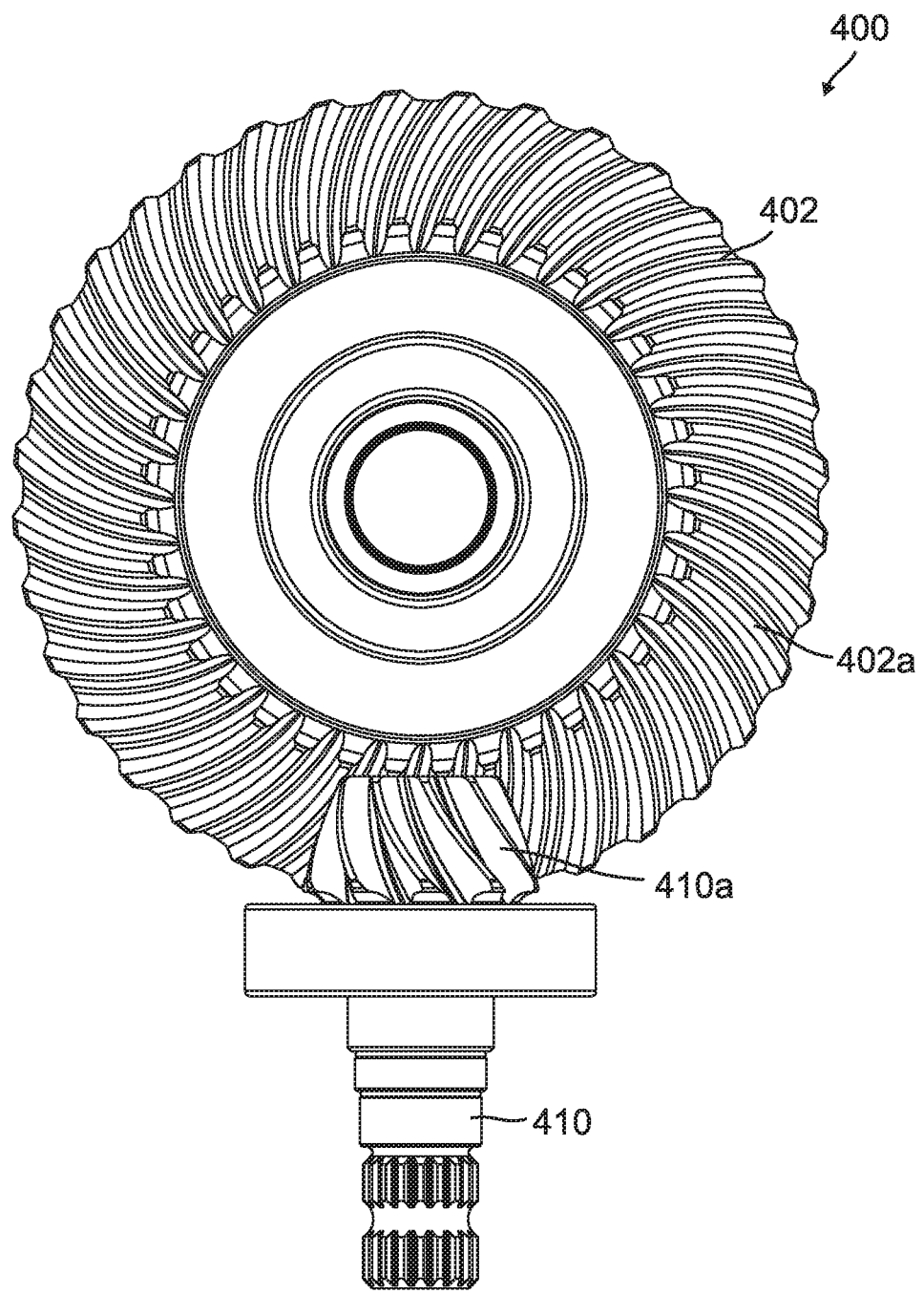
FIG. 4C is a front view of the locking differential of FIG. 4A.

Other systems that selectively couple and decouple the torque between the ring gear and the carrier are contemplated. For Example, referring to FIGS. 4A through 4C another embodiment of a locking angle gear box 400 is illustrated. In this embodiment, the locking angle gear box is a locking spool 400. As illustrated in these Figures, the ring gear 402 includes a gear interface 402a that is engaged with a pinion interface 410a of the main pinion 410 providing torque from a remaining portion of the driveline. Rotation of the ring gear 402 is selectively coupled to a spool output 404 via clutch pack 420. The spool output 404 is configured to be coupled to halfshafts in an embodiment. In the clutch pack 420, alternating clutch plates are coupled to either a clutch pack activation cover 422 that is rotationally coupled to the ring gear 202 or a surface of the carrier 404. The clutch pack activation cover 420, clutch pack 420 and spool output form at least in part the torque transfer assembly upon which the ring gear 402 is rotationally mounted. The clutch pack activation cover 422 is selectively moved into recesses in the ring gear 402 to push the alternating clutch plates together to selectively couple torque between the ring gear 402 and the spool output 404.

Another example of locking differential 500 is illustrated in FIGS. 5A through 5E. This embodiment of the locking differential 500 engages the ring gear 502 from the opposite side of the carrier 504. This allows for alternative packaging and may improve axial packaging density. Within the carrier 504 is housed carrier pinions 562a and 562b mounted on differential pin 560 and side gears 570a and 570b. A single connection drive assembly 520 (referred to as a drive dog assembly 520 in this embodiment) includes a first set of disengaging/engaging members 520a and a second set of lock engaging members 520b. The first set of disengage/engaging members 520a are received in slots 503 of the ring carrier 502 to lock rotation of the drive dog assembly 520 with rotation of the ring gear 502. FIGS. 5A and 5B illustrate the locking differential 500 in a 2WD configuration. In this configuration the ring gear 502 rotates independently from the carrier 504. Hence, torque from the main pinion 510 to the ring gear 502 via the pinion interface 510a/ring gear interface 502a is not coupled to the carrier 504 in this two wheel drive configuration.

FIGS. 5C and 5D illustrate locking differential 500 in a 4WD configuration. As illustrated, in this configuration, the drive dog assembly 520 has been axially moved towards the ring gear 502 which causes the second disengaging/engaging members 520b to move into slots 504a of the carrier 504 to lock rotation of the carrier 504 to the rotation of the ring gear 502. FIGS. 5E and 5F illustrate the locking differential 500 in a 4WDL configuration. In this configuration, the drive dog assembly 520 has been moved farther axially towards the ring gear 502 so the second lock engaging members 520b further move into slots 571 of side gear 570b to rotatably fix side gear 570b to the carrier 504. This locks the differential gearing of the locking differential 500.

Another example of locking differential 600 is illustrated in FIGS. 6A through 6E. Within the carrier 604 are housed carrier pinions 662a and 662b mounted on differential pin 660 and side gears 670a and 670b. A single connection drive assembly 620 (referred to as a drive dog assembly 620 in this embodiment) includes engaging members 620a and centrally located interior splines 621. FIGS. 6A and 6B illustrate the locking differential 600 in a 2WD configuration. In this configuration the ring gear 602 rotates independently from the carrier 604. Hence, torque from the main pinion 610 to the ring gear 602 via the pinion interface 610a/ring gear interface 602a is not coupled to the carrier 604 in this 2WD configuration.

FIGS. 6C and 6D illustrate locking differential 600 in a 4WD configuration. As illustrated, in this configuration, the drive dog assembly 620 has been axially moved towards the ring gear 602 a select distance which causes the engaging members 620a to move into ring gear bores 605 to lock rotation of the carrier 604 to the rotation of the ring gear 602. FIGS. 6E and 6F illustrate the locking differential 600 in a 4WDL configuration. In this configuration, the drive dog assembly 620 has been moved farther axially towards the ring gear 602 so the interior splines 621 of the drive dog assembly 620 engage exterior splines 671 on side gear 670a to rotatably fix side gear 670a to the carrier 604 via the drive dog assembly 620. This locks the differential gearing of the locking differential 600.

Figure 7B:
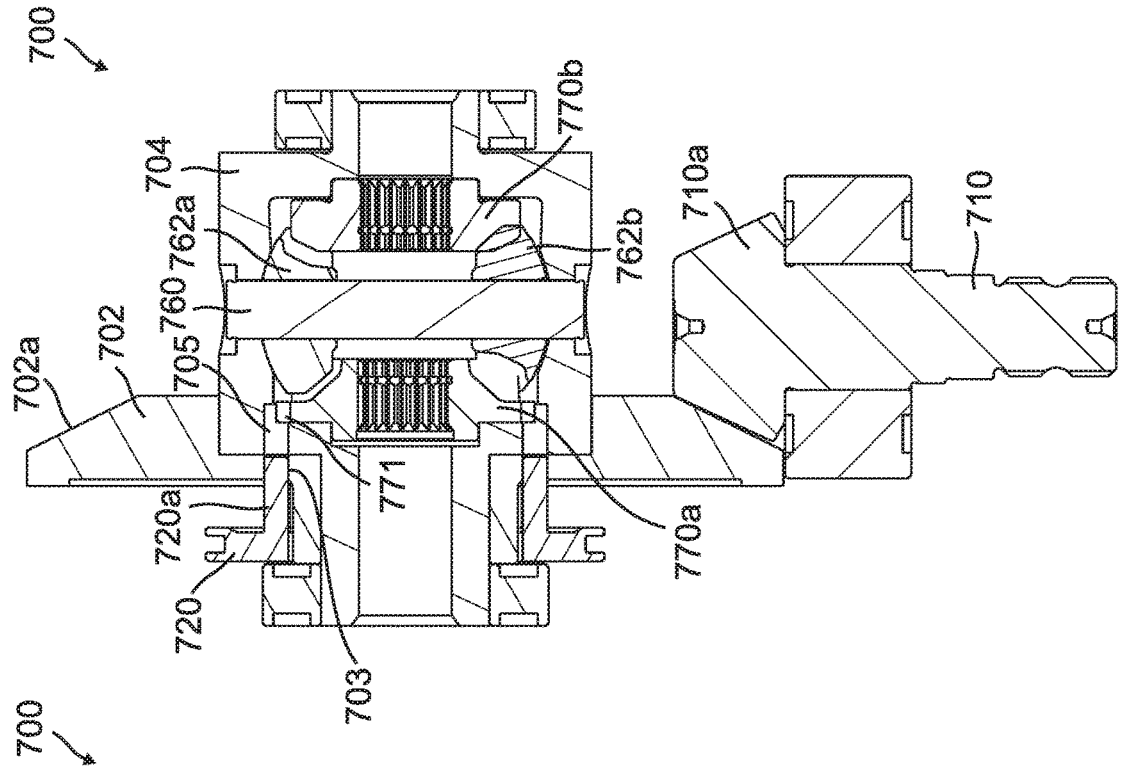
FIG. 7B is a cross-sectional side view of the locking differential of FIG. 7A in the two wheel drive configuration.
Figure 7A:
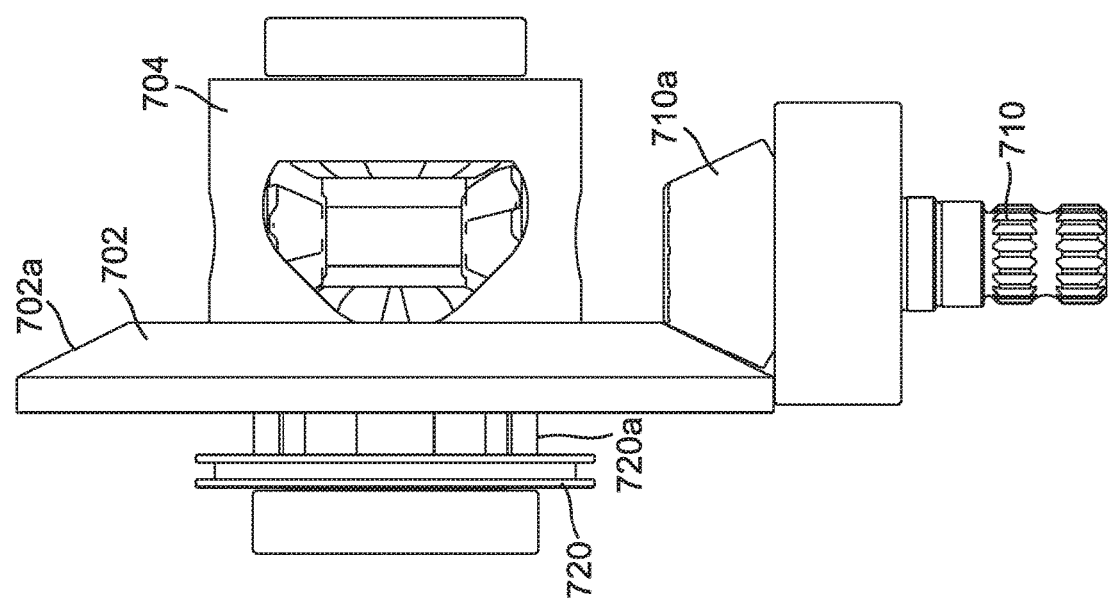
FIG. 7A is a side view of another locking differential in a two wheel drive configuration according to one exemplary embodiment.

Another example of locking differential 700 is illustrated in FIGS. 7A through 7E. Within the carrier 704 are housed carrier pinions 762a and 762b mounted on differential pin 760 and side gears 770a and 770b. A single connection drive assembly 720 (referred to as a drive dog assembly 720 in this embodiment) includes engaging members 720a. FIGS. 7A and 7B illustrate the locking differential 700 in a 2WD configuration. In this configuration the ring gear 702 rotates independently from the carrier 704. Hence, torque from the main pinion 710 to the ring gear 702 via the pinion interface 710a/ring gear interface 702a is not coupled to the carrier 704 in this two wheel drive configuration.

Figure 7D:
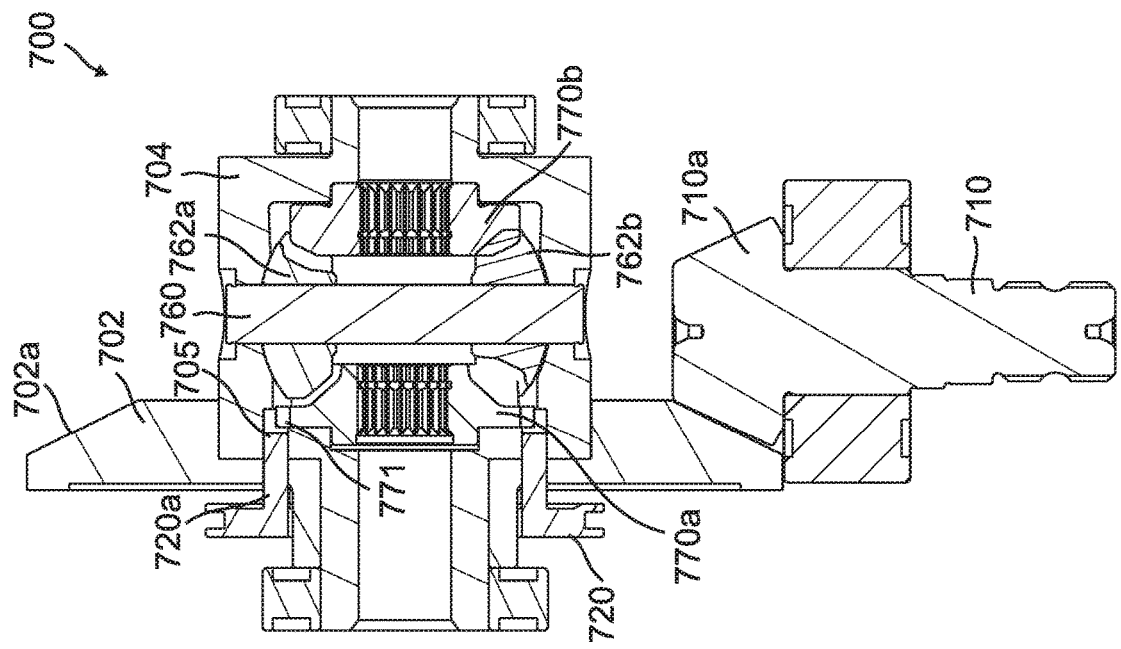
FIG. 7D is a cross-sectional side view of the locking differential of FIG. 7A in the four wheel drive configuration.
Figure 7C:
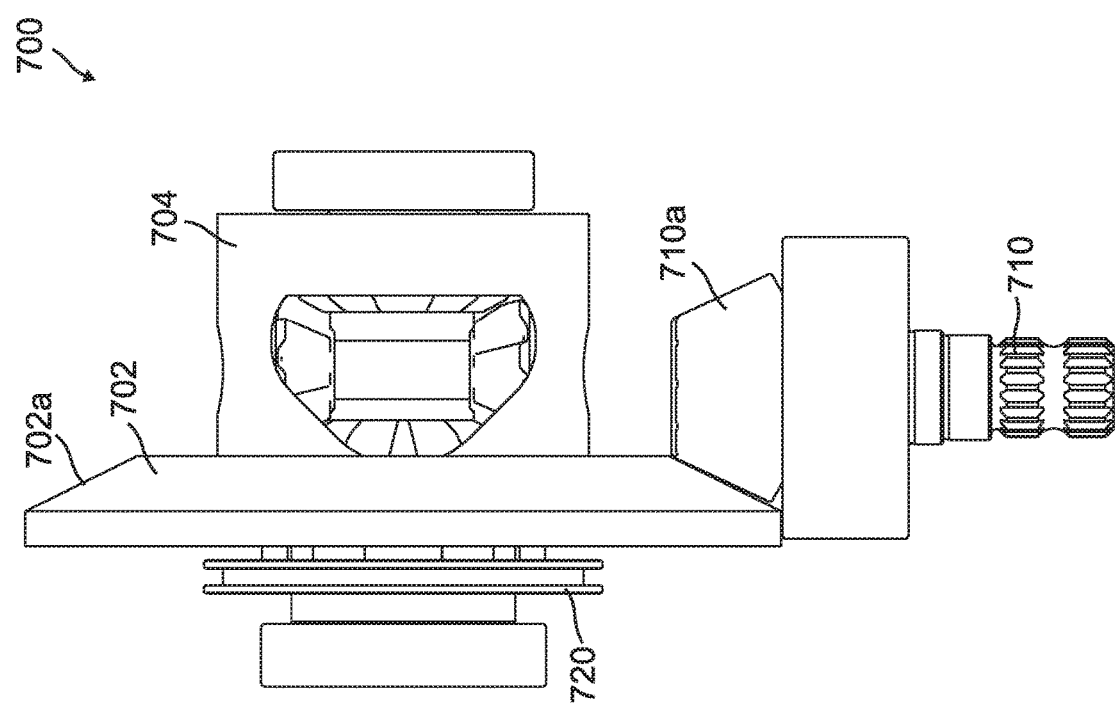
FIG. 7C is a side view of the locking differential of FIG. 7A in a four wheel drive configuration.

FIGS. 7C and 7D illustrate locking differential 700 in a 4WD configuration. As illustrated, in this configuration, the drive dog assembly 720 has been axially moved towards the ring gear 702 a select distance which causes the engaging members 720a to move into ring gear passages 705 to lock rotation of the carrier 704 to the rotation of the ring gear 702. FIGS. 7E and 7F illustrate the locking differential 700 in a 4WDL configuration. In this configuration, the dog lock 720 has been moved farther axially towards the ring gear 702 so the engaging members 720a further engage side gear 770a. This locks the differential gearing of the locking differential 700.

Figure 8:
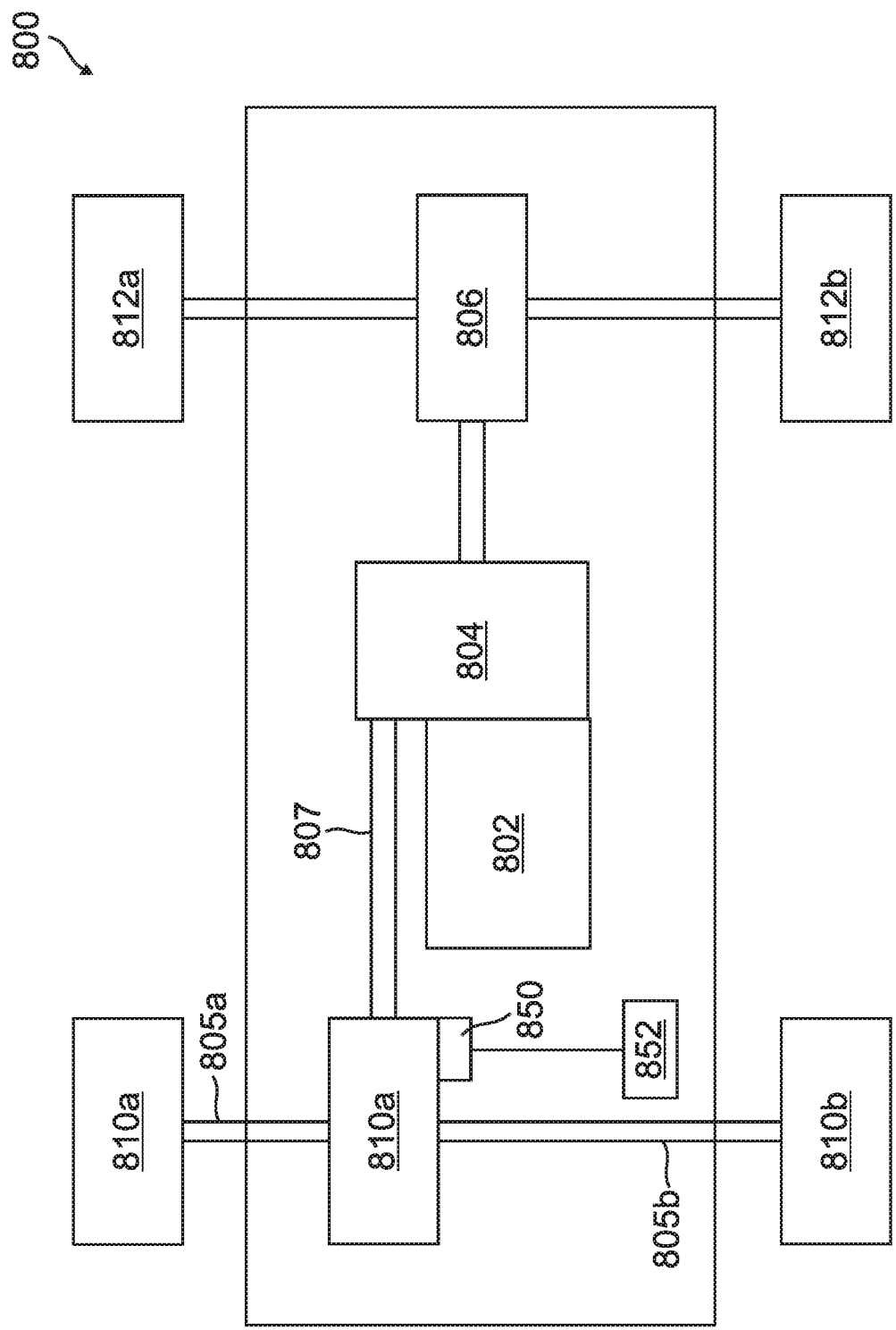
FIG. 8, is a block diagram of vehicle implementing a locking differential of an exemplary embodiment.

Referring to FIG. 8, a block diagram of an example embodiment of vehicle 800 implementing a locking differential 808 as described in the embodiments above, is illustrated. The vehicle 800 is illustrated as including a motor 802 which may be an internal combustion engine, an electrical motor, a combination of the two or some other type of motor that generates power. The motor 802 couples torque to a transmission 804. The transmission may be a manual transmission, an automatic transmission, a continuously variable transmission, a combination of different transmission systems, a transaxle, etc. The transmission 804 conveys torque to, in this example, a rear differential 806 and the front locking differential 808 (or selective torque coupling device) via respective propeller 807 or drive shaft 807. The rear differential 806 couples torque to rear wheels 812a and 812b via end or half shafts.

The front differential 808 of the vehicle 800 selectively couples torque to front wheels 810a and 810b via halfshafts 805a and 805b. Further illustrated in FIG. 8 is an actuator 850 to place the front differential 808 in one of the 2WD, 4WD and 4WDL configurations. An input controller 852 is also illustrated that is in communication with the actuator 850 to control the actuator 850 in placing the differential in a select 2WD, 4WD or 4WDL configuration. The input controller 852 may include an operator input, a vehicle controller (automatic selection of configuration based on a then current operating performance of the vehicle) or a combination of both. Other vehicle configurations are contemplated, such as a configuration where the locking differential is implemented in relation to rear wheels.

EXAMPLE EMBODIMENTS

Example 1, includes a locking angle gear box including a torque transfer assembly, a ring gear, at least one connection drive assembly and an actuator. The torque transfer assembly is configured to communicate torque between the torque transfer assembly and a pair of outputs to halfshafts. The ring gear is rotationally supported on the torque transfer assembly. The ring gear is configured to transfer torque between at least a portion of a driveline and the torque transfer assembly. The at least one connection drive assembly is configured to selectively lock rotation of the torque transfer assembly with the rotation of the ring gear to selectively couple torque between the torque transfer assembly and the ring gear. The actuator is in communication with the at least one connection drive assembly to selectively manipulate the at least one connection drive assembly.

Example 2, includes the locking angle gear box of Example 1, wherein the torque transfer assembly is a carrier including differential gearing.

Example 3 includes the locking angle gear box of Examples 2, wherein the differential gearing includes at least one pair of carrier pinions rotationally mounted on a differential pin within the carrier and a first side gear and a second side gear positioned within the carrier to engage the pair of carrier pinions.

Example 4 includes the locking angle gear box of Example 3, wherein the at least one connection drive assembly further includes a drive dog assembly. The drive dog assembly includes a manipulation portion that is in communication with the actuator and at least one first engaging member that is received in at least one of a passage and slot in one of the ring gear and carrier and is further configured to be selectively received within one of a passage and slot in one of the other of the ring gear and carrier to lock rotation of the carrier to the ring gear.

Example 5 include the locking angle gear box of Example 4, wherein the drive dog assembly further comprises at least one second engaging member that is configured to selectively engage one of the first and second side gears to selectively lock the differential gearing.

Example 6 include the locking angle gear box of Example 3, wherein the at least one connection drive assembly further includes a drive dog assembly. The drive dog assembly includes a manipulation portion that is in communication with the actuator, at least one engaging member and an interior splines. The at least one engaging member is received in at least one passage through of one of the ring gear and carrier. The interior splines are configured to selectively engage exterior splines on one of the first and second side gears to selectively lock the differential gearing.

Example 7 includes the locking angle gear box of any of the Examples 1-6, further including a shift rod and at least one fork. The shift rod is in communication with the actuator. The at least one fork is in communication with the shift rod. The at least one fork is configured to manipulate the at least one connection drive assembly.

Example 8 includes the locking angle gear box of Example 2, wherein the at least one connection drive assembly further comprises a lock drive dog assembly and disconnect drive dog assembly. The lock drive dog assembly includes a lock manipulation portion that is in communication with the actuator and at least one lock engaging member that is received in at least one passage through one of the ring gear and carrier. The at least one lock engaging member is further configured to selectively engage differential gearing within the carrier to selectively lock the differential gearing. The disconnect drive dog assembly includes a disconnect manipulation portion in communication with the actuator and at least one disengaging/engaging member that received in at least one passage through one of the ring gear and the carrier. The at least one disengaging/engaging member is further configured to be received in at least one bore of one of the other ring gear and carrier.

Example 9 includes the locking angle gear box of Example 8, further including a shift rod, a lock fork and a disconnect fork. The shift rod is in communication with the actuator. The lock fork is in communication with the shift rod. The lock fork is configured to manipulate the lock drive dog assembly. The disconnect fork is in communication with the shift rod. The disconnect fork is configured to manipulate the disconnect drive dog assembly.

Example 10 includes the locking angle gear box of Example 1, wherein the torque transfer assembly is a locking spool.

Example 11 includes the locking angle gear box of Example 10, wherein the at least one connection drive assembly further includes a clutch pack and a clutch pack activation cover that is configured to be manipulated by the actuator to selectively activate the clutch pack.

Example 12 includes the locking angle gear box of any of the Examples 1-11, wherein the actuator is at least one of an electrical actuator, hydraulic actuator, pneumatic actuator and a manual actuator.

Example 13 is a locking differential that includes a carrier, a differential gearing, a ring gear, a lock drive dog assembly, a disconnect drive dog assembly and at least one actuator. The carrier having at least one carrier connection passage. The differential gearing is housed within the carrier. The ring gear is rotationally mounted on the carrier. The ring gear has at least one ring gear connection passage. The lock drive dog assembly has at least one lock engaging member that is configured to selectively engage the differential gearing in the carrier to selectively lock the differential gearing. The disconnect drive dog assembly has at least one disengaging/engaging member received in at least one passage through one of the ring gear and the carrier. The at least one disengaging/engaging member is further configured to be selectively received in at least one bore of one of the other ring gear and carrier to selectively lock rotation of the carrier with the rotation of the ring gear. The at least one actuator is used to selectively manipulate the lock drive dog assembly and the disconnect drive dog assembly.

Example 14 includes the locking differential of Example 13, wherein the lock drive dog assembly includes a lock manipulation portion in communication with the actuator and the disconnect drive dog assembly includes a disconnect manipulation portion in communication with the actuator.

Example 15 includes the locking differential of any of the Examples 13-14, wherein the differential gearing further includes at least one pair of carrier pinions rotationally mounted on a differential pin within the carrier and a first side gear and a second side gear positioned within the carrier to engage the pair of carrier pinions. The at least one lock engaging member of the lock drive assembly is configured to selectively engage one of the first and second side gears.

Example 16 includes the locking differential of any of the Examples 13-15, further including a shift rod, a lock fork and a disconnect fork. The shift rod is in communication with the actuator. The lock fork is in communication with the shift rod. The lock fork is configured to manipulate the lock drive dog assembly. The disconnect fork is in communication with the shift rod. The disconnect fork is configured to manipulate the disconnect drive dog assembly.

Example 17, includes the locking differential of Example 16, further including at least one biasing member positioned to assert a biasing force on at least one of the lock fork and the disconnect fork.

Example 18 is a vehicle including a front locking differential. The vehicle includes a motor to generate torque, at least a portion of a driveline and the front locking differential. The portion of a driveline is configured to convey the torque to the front locking differential, a pair of rear wheels and a pair of front wheels. The front locking differential includes a carrier, a ring gear, at least one connection drive assembly and an actuator. The carrier is configured to communicate torque between the carrier and a pair of halfshafts. The ring gear is rotationally mounted on the carrier. The ring gear is configured to transfer torque between at least a portion of a driveline and the carrier. The at least one connection drive assembly is configured to selectively lock rotation of the ring gear with the rotation of the carrier to selectively couple torque between the ring gear and the carrier. The actuator is in communication with the at least one connection drive assembly to selectively manipulate the at least one connection assembly. Each front wheel is in rotational communication with a respective halfshaft of the pair of halfshafts.

Example 19 includes the vehicle of Example 18 wherein the carrier further includes differential gearing that includes at least one pair of carrier pinions that are rotationally mounted on a differential pin within the carrier and a first side gear and a second side gear positioned within the carrier to engage the pair of carrier pinions.

Example 20 includes the vehicle of Example 18, wherein the at least one connection drive assembly further includes a lock drive dog assembly and a disconnect drive dog assembly. The lock drive dog assembly includes a lock manipulation portion in communication with the actuator and at least one lock engaging member that is received in at least one passage through of one of the ring gear and carrier. The at least one lock engaging member is further configured to selectively engage one of the first and second side gear to selectively lock the differential gearing. The disconnect drive assembly includes a disconnect manipulation portion in communication with the actuator and at least one disengaging/engaging member received in at least one passage through one of the ring gear and the carrier. The at least one disengaging/engaging member is further configured to be received in at least one bore of one of the other ring gear and carrier.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A locking angle gear box comprising:
   a torque transfer assembly configured to communicate torque between the torque transfer assembly and a pair of outputs to halfshafts;
   a ring gear rotationally supported on the torque transfer assembly, the ring gear configured to transfer torque between at least a portion of a driveline and the torque transfer assembly;
   at least one connection drive assembly configured to selectively lock rotation of the torque transfer assembly with the rotation of the ring gear to selectively couple torque between the torque transfer assembly and the ring gear;
   an actuator in communication with the at least one connection drive assembly to selectively manipulate the at least one connection drive assembly; and
   wherein the at least one connection drive assembly further includes a drive dog assembly, the drive dog assembly includes,
      a manipulation portion in communication with the actuator; and
      at least one first engaging member received in at least one of a passage and slot in one of the ring gear and the torque transfer assembly and configured to be selectively received within one of a passage and slot in one of another of the ring gear and the torque transfer assembly to lock rotation of the torque transfer assembly to the ring gear.

2. The locking angle gear box of claim 1, wherein the torque transfer assembly is a carrier including differential gearing.

3. The locking angle gear box of claim 2, wherein the differential gearing includes:
   at least one pair of carrier pinions rotationally mounted on a differential pin within the carrier; and
   a first side gear and a second side gear positioned within the carrier to engage the pair of carrier pinions.

4. The locking angle gear box of claim 3, wherein the drive dog assembly further comprising:
   at least one second engaging member configured to selectively engage one of the first and second side gears to selectively lock the differential gearing.

5. The locking angle gear box of claim 3, wherein the at least one connection drive assembly further includes a drive dog assembly, the drive dog assembly comprising:
   a manipulation portion in communication with the actuator;
   at least one engaging member received in at least one passage through of one of the ring gear and carrier; and
   interior splines configured to selectively engage exterior splines on one of the first and second side gears to selectively lock the differential gearing.

6. The locking angle gear box of claim 1, further comprising:
   a shift rod in communication with the actuator; and
   at least one fork in communication with the shift rod, the at least one fork configured to manipulate the at least one connection drive assembly.

7. The locking angle gear box of claim 1, wherein the torque transfer assembly is a locking spool.

8. The locking angle gear box of claim 7, wherein the at least one connection drive assembly further comprises:
a clutch pack, and
a clutch pack activation cover configured to be manipulated by the actuator to selectively activate the clutch pack.

9. The locking angle gear box of claim 1, wherein the actuator is at least one of an electrical actuator, hydraulic actuator, pneumatic actuator and a manual actuator.

10. A locking angle gear box comprising:
a torque transfer assembly configured to communicate torque between the torque transfer assembly and a pair of outputs to halfshafts;
a ring gear rotationally supported on the torque transfer assembly, the ring gear configured to transfer torque between at least a portion of a driveline and the torque transfer assembly;
at least one connection drive assembly configured to selectively lock rotation of the torque transfer assembly with the rotation of the ring gear to selectively couple torque between the torque transfer assembly and the ring gear;
an actuator in communication with the at least one connection drive assembly to selectively manipulate the at least one connection drive assembly;
wherein the at least one connection drive assembly further includes a lock drive dog assembly,
the lock drive dog assembly including,
a lock manipulation portion in communication with the actuator; and
at least one lock engaging member received in at least one passage through one of the ring gear and torque transfer assembly, the at least one lock engaging member further configured to selectively engage differential gearing within the torque transfer assembly to selectively lock the differential gearing; and
a disconnect drive dog assembly including,
a disconnect manipulation portion in communication with the actuator; and
at least one disengaging/engaging member received in at least one passage through one of the ring gear and the torque transfer assembly, the at least one disengaging/engaging member further configured to be received in at least one bore of another of the ring gear and the torque transfer assembly.

11. The locking angle gear box of claim 10, further comprising:
a shift rod in communication with the actuator;
a lock fork in communication with the shift rod, the lock fork configured to manipulate the lock drive dog assembly; and
a disconnect fork in communication with the shift rod, the disconnect fork configured to manipulate the disconnect drive dog assembly.

12. A locking differential comprising:
a carrier having at least one carrier connection passage;
differential gearing housed within the carrier;
a ring gear rotatably mounted on the carrier, the ring gear having at least one ring gear connection passage;
a lock drive dog assembly having at least one lock engaging member configured to selectively engage the differential gearing in the carrier to selectively lock the differential gearing;
a disconnect drive dog assembly having at least one disengaging/engaging member received in at least one passage through one of the ring gear and the carrier, the at least one disengaging/engaging member further configured to be selectively received in at least one bore of one of another of the ring gear and the carrier to selectively lock rotation of the carrier with the rotation of the ring gear; and
at least one actuator to selectively manipulate the lock drive dog assembly and the disconnect drive dog assembly.

13. The locking differential of claim 12, wherein:
the lock drive dog assembly includes a lock manipulation portion in communication with the actuator; and
the disconnect drive dog assembly includes a disconnect manipulation portion in communication with the actuator.

14. The locking differential of claim 12, wherein the differential gearing further comprises:
at least one pair of carrier pinions rotationally mounted on a differential pin within the carrier; and
a first side gear and a second side gear positioned within the carrier to engage the pair of carrier pinions, the at least one lock engaging member of the lock drive assembly configured to selectively engage one of the first and second side gears.

15. The locking differential of claim 12, further comprising:
a shift rod in communication with the actuator;
a lock fork in communication with the shift rod, the lock fork configured to manipulate the lock drive dog assembly; and
a disconnect fork in communication with the shift rod, the disconnect fork configured to manipulate the disconnect drive dog assembly.

16. The locking differential of claim 15, further comprising:
at least one biasing member positioned to assert a biasing force on at least one of the lock fork and the disconnect fork.

17. A vehicle including a front locking differential, the vehicle comprising:
a motor to generate torque;
at least a portion of a driveline configured to convey the torque to the front locking differential and pair of rear wheels, the front locking differential including,
a carrier configured to communicate torque between the carrier and a pair of halfshafts,
a ring gear rotationally mounted on the carrier, the ring gear configured to transfer torque between at least a portion of a driveline and the carrier,
at least one connection drive assembly configured to selectively lock rotation of the ring gear with the rotation of the carrier to selectively couple torque between the ring gear and the carrier; and
an actuator in communication with the at least one connection drive assembly to selectively manipulate the at least one connection assembly;
a pair of front wheels, each front wheel in rotational communication with a respective halfshaft of the pair of halfshafts;
the at least one connection drive assembly further includes a lock drive dog assembly and a disconnect drive dog assembly, the lock drive dog assembly including,
a lock manipulation portion in communication with the actuator; and
at least one lock engaging member received in at least one passage through of one of the ring gear and carrier, the at least one lock engaging member further configured to selectively engage differential gearing in the carrier, and the disconnect drive assembly including, a disconnect manipulation portion in communication with the actuator; and at least one disengaging/engaging member received in at least one passage through one of the ring gear and the carrier, the at least one disengaging/engaging member further configured to be received in at least one bore of one of another of the ring gear and the carrier.

18. The vehicle of claim 17, wherein the differential gearing includes:

at least one pair of carrier pinions rotationally mounted on a differential pin within the carrier; and a first side gear and a second side gear positioned within the carrier to engage the pair of carrier pinions.

* * * * *